US012811893B2

(12) United States Patent
Deowanshi et al.

(10) Patent No.: US 12,811,893 B2
(45) Date of Patent: Nov. 24, 2026

(54) CLOUD COMPUTING RESOURCE RECLAMATION ORCHESTRATION

(71) Applicant: Oracle International Corporation, Redwood Shores, CA (US)

(72) Inventors: Akhilesh Deowanshi, Manteca, CA (US); Chi-shing Tong, Kenmore, WA (US); Deepalkumar Shah, Rutherford, NJ (US); Jon K. Aimone, Tracy, CA (US); Tai-Chia Huang, Sunnyvale, CA (US); Matthew Rushton, Portsmouth, NH (US); Eric Raymond Peterson, Vashon, WA (US); Shan Ye, Kirkland, WA (US); Aryeh Polsky, Chicago, IL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/734,423

(22) Filed: Jun. 5, 2024

(65) Prior Publication Data

US 2025/0379830 A1 Dec. 11, 2025

(51) Int. Cl.
*H04L 47/74* (2022.01)
*H04L 47/70* (2022.01)

(52) U.S. Cl.
CPC .......... *H04L 47/745* (2013.01); *H04L 47/822* (2013.01)

(58) Field of Classification Search
CPC ... H04L 47/801; H04L 47/781; H04L 47/762; H04L 47/83; H04L 47/824; H04L 47/745;
(Continued)

(56) References Cited

U.S. PATENT DOCUMENTS 9,215,229 B2 12/2015 Eicken et al.
9,374,293 B2 * 6/2016 Chai ...................... H04L 45/02
(Continued)

FOREIGN PATENT DOCUMENTS

CN 115185671 A 10/2022
JP 2017-512329 A 5/2017
(Continued)

OTHER PUBLICATIONS

Amazon Web Services. Regions and Zones. Accessed on Jan. 24, 2024. Available online at https://docs.aws.amazon.com/AWSEC2/latest/UserGuide/using-regions-availability-zones.html (15 pages).
(Continued)

*Primary Examiner* — Ninos Donabed
(74) *Attorney, Agent, or Firm* — Invoke

(57) ABSTRACT

A method includes receiving, at a first instance of a resource reclamation service, a lifecycle event for a cloud computing tenancy, where the first instance is deployed at a first region of a plurality of regions of a cloud environment; identifying, at the first instance, a subset of the plurality of regions to which computing resources of the tenancy are deployed, the subset of the plurality of regions including the first region and a second region; transmitting, from the first instance to a second instance of the resource reclamation service, an indication of the lifecycle event, where the second instance is deployed at the second region; identifying, at the second instance, a first subset of the computing resources of the tenancy deployed at the second region; and executing, at the second instance, a first set of reclamation actions for the first subset of the computing resources of the tenancy.

25 Claims, 16 Drawing Sheets

(58) Field of Classification Search
CPC ....... H04L 47/805; H04L 47/15; H04L 47/70; H04L 47/822
See application file for complete search history.

(56) References Cited

U.S. PATENT DOCUMENTS

| | | | | |
|---|---|---|---|---|
| 9,436,515 | B2 * | 9/2016 | Pohlmann | G06F 9/5088 |
| 10,148,793 | B2 * | 12/2018 | Averbuj | H04L 45/306 |
| 10,362,096 | B2 | 7/2019 | Stefanov et al. | |
| 10,454,940 | B2 | 10/2019 | Lander et al. | |
| 10,567,388 | B1 | 2/2020 | Kruse et al. | |
| 10,592,216 | B1 | 3/2020 | Richardson et al. | |
| 10,599,564 | B2 * | 3/2020 | Qi | G06F 12/0276 |
| 10,656,863 | B1 | 5/2020 | Vines et al. | |
| 10,678,677 | B1 * | 6/2020 | Kuris | G06F 11/362 |
| 10,873,541 | B2 * | 12/2020 | Alvarez Callau | G06F 9/5072 |
| 10,917,358 | B1 * | 2/2021 | Herle | G06F 9/485 |
| 11,005,733 | B2 | 5/2021 | Savov et al. | |
| 11,042,418 | B2 | 6/2021 | Thimmappa et al. | |
| 11,099,909 | B2 | 8/2021 | Raikov et al. | |
| 11,106,386 | B1 * | 8/2021 | Sun | G06F 16/2455 |
| 11,170,137 | B1 | 11/2021 | Richardson et al. | |
| 11,171,994 | B2 | 11/2021 | Ramachandran et al. | |
| 11,231,955 | B1 | 1/2022 | Shahane et al. | |
| 11,755,415 | B2 | 9/2023 | Madhavarapu et al. | |
| 12,101,256 | B1 * | 9/2024 | Rangaiyengar | H04L 47/12 |
| 12,168,615 | B1 * | 12/2024 | Mohammad | C02F 1/265 |
| 12,260,261 | B2 * | 3/2025 | Kalley | G06F 9/547 |
| 2008/0243993 | A1 * | 10/2008 | Wang | H04L 41/5045 709/203 |
| 2008/0320540 | A1 * | 12/2008 | Brooks | H04L 41/0896 725/118 |
| 2010/0014540 | A1 * | 1/2010 | Brocke | H04L 47/724 370/431 |
| 2011/0029981 | A1 * | 2/2011 | Jaisinghani | G06F 11/203 718/100 |
| 2014/0016650 | A1 * | 1/2014 | Chai | H04L 45/12 370/431 |
| 2014/0165060 | A1 * | 6/2014 | Muller | G06F 9/45558 718/1 |
| 2015/0222646 | A1 | 8/2015 | Diehl et al. | |
| 2016/0050119 | A1 * | 2/2016 | Chhabra | H04L 47/724 370/241.1 |
| 2016/0077846 | A1 * | 3/2016 | Phillips | G06F 9/5072 718/1 |
| 2016/0359949 | A1 * | 12/2016 | Hess | G06F 3/0608 |
| 2017/0054617 | A1 * | 2/2017 | Cropper | G06F 9/5083 |
| 2017/0250922 | A1 * | 8/2017 | Madduri | H04L 47/83 |
| 2017/0371582 | A1 | 12/2017 | Chrysanthakopoulos et al. | |
| 2018/0145884 | A1 * | 5/2018 | Stefanov | H04L 67/10 |
| 2018/0167275 | A1 * | 6/2018 | Kovacheva | H04L 41/40 |
| 2018/0241804 | A1 * | 8/2018 | Calo | G06F 9/466 |
| 2018/0359162 | A1 * | 12/2018 | Savov | H04L 41/0897 |
| 2019/0132211 | A1 | 5/2019 | Yeung et al. | |
| 2019/0188570 | A1 * | 6/2019 | Aldea Lopez | G06F 9/485 |
| 2020/0192585 | A1 * | 6/2020 | Parker | G06F 12/1458 |
| 2020/0201790 | A1 * | 6/2020 | Kovacevic | G06F 12/10 |
| 2020/0218673 | A1 * | 7/2020 | Parker | G06F 12/1458 |
| 2020/0401455 | A1 | 12/2020 | Church, IV et al. | |
| 2021/0051153 | A1 | 2/2021 | Bogdanich Espina et al. | |
| 2021/0150515 | A1 * | 5/2021 | Lu | G06Q 20/389 |
| 2021/0160075 | A1 * | 5/2021 | Lu | H04L 9/3239 |
| 2021/0294672 | A1 | 9/2021 | Baneva et al. | |
| 2021/0303674 | A1 * | 9/2021 | Wood | G06F 12/1458 |
| 2021/0334222 | A1 * | 10/2021 | Wood | G06F 12/1441 |
| 2021/0406090 | A1 | 12/2021 | Dimitrov et al. | |
| 2022/0116262 | A1 | 4/2022 | Dandu et al. | |
| 2022/0200927 | A1 * | 6/2022 | Li | H04L 47/83 |
| 2023/0029331 | A1 * | 1/2023 | Chisnall | G06F 12/0292 |
| 2023/0168929 | A1 | 6/2023 | Wadekar et al. | |
| 2023/0251871 | A1 | 8/2023 | Miller et al. | |
| 2024/0054079 | A1 * | 2/2024 | Han | G06F 12/023 |
| 2024/0419500 | A1 * | 12/2024 | Noskov | G06F 9/5038 |
| 2025/0259085 | A1 * | 8/2025 | Crabtree | G06N 5/043 |

FOREIGN PATENT DOCUMENTS

| | | | |
|---|---|---|---|
| WO | 2019056688 | A1 | 3/2019 |
| WO | 2022140065 | A1 | 6/2022 |
| WO | 2022151776 | A1 | 7/2022 |

OTHER PUBLICATIONS

Bourdeau R. Automated Reclamation Part 3—Recovering Inactive Resources. https://blogs.vmware.com/management/2014/02/automated-reclamation-part-3-recovering-inactive-resources.html Feb. 24, 2014 (1 page).

Dartois, J.-E., et al. "Using quantile regression for reclaiming unused cloud resources while achieving sla." 2018 IEEE International Conference on Cloud Computing Technology and Science (CloudCom). IEEE, 2018 (11 pages).

Google Cloud. Regions and zones. Accessed Jan. 24, 2024. Available online at https://cloud.google.com/compute/docs/regions-zones (3 pages).

IBM Cloud Docs. Using resource reclamations https://cloud.ibm.com/docs/account?topic=account-resource-reclamation&interface=cli. Accessed on Jan. 23, 2024. (5 pages).

IBM Documentation. Resource reclaim. https://www.ibm.com/docs/en/spectrum-symphony/7.3.1?topic=plans-resource-reclaim Accessed Jan. 23, 2024 (13 pages).

Loeser, H. Data Henrik. To restore or to delete: Working with IBM Cloud resource reclamation. https://blog.4loeser.net/2021/09/how-to-ibm-cloud-resource-reclamation.html. Sep. 22, 2021 (2 pages).

Microsoft Learn. What are availability zones? Sep. 23, 2023. Available online at https://learn.microsoft.com/en-us/azure/reliability/availability-zones-overview?tabs=azure-cli (3 pages).

Ninawe, S. Destroy Command—How to Destroy Resources https://spacelift.io/blog/how-to-destroy-terraform-resources. Updated Dec. 5, 2023 (13 pages).

Oracle. Regions and Availability Domains. Available online at https://docs.oracle.com/en-us/iaas/Content/General/Concepts/regions.htm (2024, 5 pages).

Sharma, P. et al. "Resource deflation: A new approach for transient resource reclamation." Proceedings of the Fourteenth EuroSys Conference 2019. 2019 (17 pages).

Zhao, L., et al. "Component-distinguishable Co-location and Resource Reclamation for High-throughput Computing." ACM Transactions on Computer Systems 42.1-2 (2024): 1-36.

Zhu, J., et al. "QoS-aware co-scheduling for distributed long-running applications on shared clusters." IEEE Transactions on Parallel and Distributed Systems 33.12 (2022): 4818-4834.

"Apply tag-based access control in Amazon Connect", Retrieved from https://docs.aws.amazon.com/connect/latest/adminguide/tag-based-access-control.html, pp. 3. Date not available.

"Controlling access to AWSresources using tags", Retrieved from https://docs.aws.amazon.com/IAM/latest/UserGuide/access_tags.html, Retrieved on Jul. 30, 2026, pp. 1-5.

"Define permissions based on attributes with ABAC authorization", Retrieved from https://docs.aws.amazon.com/IAM/latest/UserGuide/introduction_attribute-based-access-control.html, Apr. 6, 2026, pp. 1-6.

"Tag-based Access Policy", Retrieved from https://iomete.com/resources/user-guide/data-security/tag-based-access-policy, Retrieved on Jul. 30, 2026, pp. 1-4.

"Tags and conditional access", Retrieved from https://docs.cloud.google.com/iam/docs/tags-access-control, Retrieved on Jul. 30, 2026, pp. 1-3.

"What is Azure attribute-based access control (Azure ABAC)?", Retrieved from https://learn.microsoft.com/en-US/azure/role-based-access-control/conditions-overview, Retrieved on Jul. 30, 2026, pp. 1-7.

* cited by examiner

CLOUD COMPUTING RESOURCE RECLAMATION ORCHESTRATION

FIELD

The present disclosure relates to error and fault prevention within cloud-based computing systems and, more particularly, to error and fault prevention during the deployment and reclamation of computing resources within cloud-based computing systems.

SUMMARY

Cloud computing resources, such as resources associated with an infrastructure as a service subscription, can be deployed across computing servers in multiple regions. Such distributed deployments can provide a variety of technical benefits. For example, placing computing resources closer to end users can reduce latency and generally improve the experience for the end user while simultaneously reducing network congestion for the overall cloud computing system (e.g., by minimizing the total distance data needs to travel and reducing the number of hops for the data). When a subscription ends, cloud computing resources can be reclaimed. To prepare for reclamation, cloud computing resources should be gracefully shut down. The concept of a graceful shutdown may refer to the process of systematically and safely stopping resources to ensure that all current operations are properly completed before the resource is turned off. Gracefully shutting down cloud computing resources minimizes data loss and corruption and avoids creating cascading errors in dependent processes.

Respecting dependencies during a graceful shutdown helps the cloud computing system prevent data loss or corruption, avoid service disruption, and ensure the ability to smoothly recover and restart resources. For example, dependencies between cloud computing resources often involve data being passed between the resources. Shutting down a resource that is a data provider without first ensuring that dependent resources have completed their operations may lead to data loss or corruption. Furthermore, cloud computing resources that depend on other resources can experience failures or disruptions if the resources that they depend on are shut down unexpectedly. Coordinated shutdowns that respect dependencies ensure that resources are stopped in an order that prevents such disruptions. Additionally, shutting down cloud computing resources in a manner that respects dependencies helps prevent corruption in their states, allowing the resources to be smoothly recovered and restarted.

However, cloud computing systems often involve a complex, interconnected deployment of many cloud computing resources. Thus, determining dependencies between the resources in a manner that facilitates graceful shutdowns can be technically challenging. Furthermore, for complex deployments of resources across multiple regions, the resource reclamation process can generate a large amount of network traffic and consume a large amount of resources. Additionally, the reclamation process may be permanent. Thus, it may be beneficial to implement guardrails against inadvertent reclamation.

Systems, apparatuses, methods, and techniques described in this specification provide technical solutions to these problems and more by automatically processing dependencies for deployments of cloud computing resources, allowing resources to be gracefully started and stopped in a way that respects the dependencies. Furthermore, systems, apparatuses, methods, and techniques described in this specification allow for resource reclamation to be performed in a decentralized, local manner, reducing the overall network traffic generated by the reclamation process, which minimizes the impact of the process on the overall system. Additionally, systems, apparatuses, methods, and techniques described in this specification provide a reversible intermediate suspend state that allows for computing resources to be later resumed but frees up hardware resources for use elsewhere in the system.

A computer-implemented method includes receiving, at a first instance of a resource reclamation service, a lifecycle event for a tenancy of a cloud computing environment, where the first instance is deployed at a first region of a plurality of regions of a cloud environment; identifying, at the first instance, a subset of the plurality of regions to which computing resources of the tenancy are deployed, the subset of the plurality of regions including the first region and a second region; transmitting, from the first instance to a second instance of the resource reclamation service, an indication of the lifecycle event, where the second instance is deployed at the second region; identifying, at the second instance, a first subset of the computing resources of the tenancy deployed at the second region in response to receiving the indication of the lifecycle event at the second instance; and executing, at the second instance, a first set of reclamation actions for the first subset of the computing resources of the tenancy.

In other features, the computer-implemented method includes transmitting, from the first instance to the first instance, the indication of the lifecycle event; identifying, at the first instance, a second subset of the computing resources of the tenancy deployed at the first region; and executing, at the first instance, a second set of reclamation actions for the second subset of the computing resources of the tenancy. In other features, the computer-implemented method includes transmitting, from the second instance to the first instance, a first report indicating a success or a failure of the first set of reclamation actions. In other features, the computer-implemented method includes transmitting, from the first instance to the first instance, a second report indicating a success or a failure of the second set of reclamation actions.

In other features, the computer-implemented method includes transmitting, from the first instance to a subscription management server, a third report indicating a success or a failure of reclamation actions for the computing resources of the tenancy. In other features, the lifecycle event is one of a sequence of lifecycle events; and the subscription management server is configured to transmit a next lifecycle event to the first instance in response to receiving a report indicating a success of reclamation actions associated with a previous lifecycle event. In other features, the computer-implemented method includes determining, at the second instance, a first set of dependencies between computing resources of the first subset of the computing resources of the tenancy; and determining, at the second instance, the first set of reclamation actions based on the first set of dependencies.

In other features, the computer-implemented method includes determining, at the first instance, a second set of dependencies between computing resources of the second subset of the computing resources of the tenancy; and determining, at the first instance, the second set of reclamation actions based on the second set of dependencies. In other features, the first set of dependencies comprises a first dependency graph and the second set of dependencies comprises a second dependency graph. In other features, the plurality of regions in the cloud environment includes a third region; the computing resources of the tenancy are not deployed to the third region; and the first instance is configured to not transmit the indication of the lifecycle event to a third instance of the resource reclamation service deployed at the third region.

A system includes a first server includes a first electronic processor deployed to a first region of a plurality of regions of a cloud environment and a second server includes a second electronic processor deployed to a second region of the plurality of regions of the cloud environment. The first electronic processor is configured to receive a lifecycle event for a tenancy of a cloud computing environment, identify a subset of the plurality of regions in the cloud environment to which computing resources of the tenancy are deployed, the subset of the plurality of regions including the first region and the second region, and transmit an indication of the lifecycle event to the second electronic processor. The second electronic processor is configured to identify a first subset of the computing resources of the tenancy deployed at the second region server in response to receiving the indication of the lifecycle event, and execute a first set of reclamation actions for the first subset of the computing resources of the tenancy.

In other features, the first electronic processor is further configured to transmit the indication of the lifecycle event to the first electronic processor, identify a second subset of the computing resources of the tenancy deployed at the first region server, and execute a second set of reclamation actions for the second subset of the computing resources of the tenancy. In other features, the second electronic processor is further configured to transmit a first report indicating a success or a failure of the first set of reclamation actions to the first electronic processor. In other features, the first electronic processor is further configured to transmit a second report indicating a success or a failure of the second set of reclamation actions to the first electronic processor.

In other features, the system includes a subscription management server. The first electronic processor is further configured to transmit a third report indicating a success or a failure of reclamation actions for the computing resources of the tenancy to the subscription management server. In other features, the lifecycle event is one of a sequence of lifecycle events. The subscription management server is configured to transmit a next lifecycle event to the first electronic processor in response to receiving a report indicating a success of reclamation actions associated with a previous lifecycle event. In other features, the second electronic processor is further configured to determine a first set of dependencies between computing resources of the first subset of the computing resources of the tenancy, and determine the first set of reclamation actions based on the first set of dependencies.

In other features, the first electronic processor is further configured to determine a second set of dependencies between computing resources of the second subset of the computing resources of the tenancy, and determine the second set of reclamation actions based on the second set of dependencies. In other features, the system includes a third region server and a fourth region server. Computing resources of the tenancy are deployed to the third region server and are not deployed to the fourth region server. The first electronic processor is configured to transmit the indication of the lifecycle event to the third region server and not transmit the indication of the lifecycle event to the fourth region server.

A non-transitory computer-readable medium includes executable instructions that, when executed by an electronic processor, cause the electronic processor to perform a set of functions including receiving, at a first instance of a resource reclamation service, a lifecycle event for a tenancy of a cloud computing environment, where the first instance is deployed at a first region of a plurality of regions of a cloud environment; identifying, at the first instance, a subset of the plurality of regions to which computing resources of the tenancy are deployed, the subset of the plurality of regions including the first region and a second region; transmitting, from the first instance to a second instance of the resource reclamation service, an indication of the lifecycle event, where the second instance is deployed at the second region; identifying, at the second instance, a first subset of the computing resources of the tenancy deployed at the second region in response to receiving the indication of the lifecycle event at the second instance; and executing, at the second instance, a first set of reclamation actions for the first subset of the computing resources of the tenancy.

Other examples, embodiments, features, and aspects will become apparent by consideration of the detailed description and accompanying drawings.

BRIEF DESCRIPTION OF THE DRAWINGS

In the drawings, reference numbers may be reused to identify similar and/or identical elements.

DETAILED DESCRIPTION

Cloud-Based Computing Platforms

Figure 1:
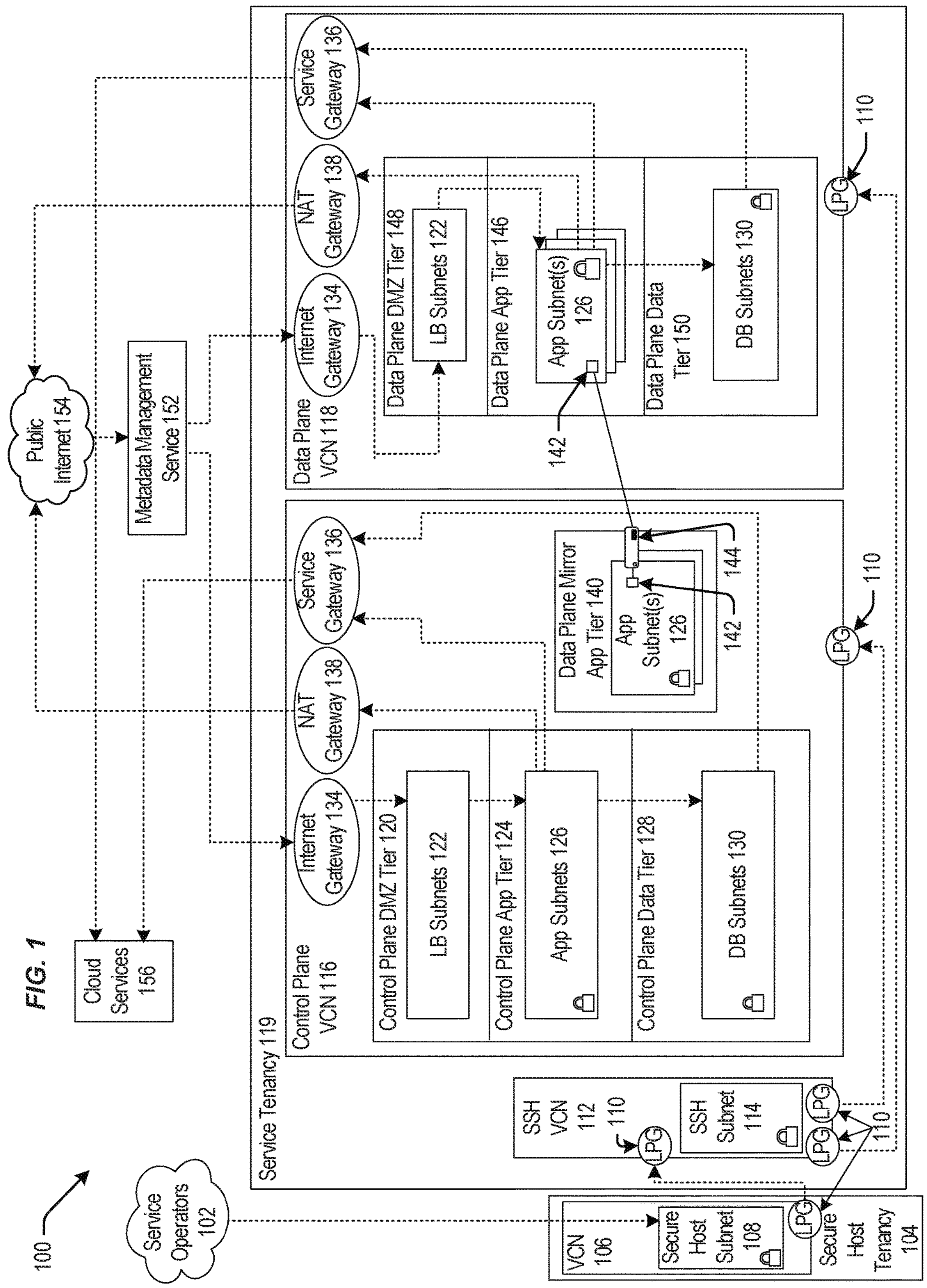
FIG. 1 is a block diagram illustrating an example pattern of an infrastructure as a service architecture.

Embodiments described herein may performed, wholly or partly, within a cloud-based computing platform. Cloud-based computing platforms provide scalable and flexible computing resources for users. Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram 100 illustrating an example pattern of an IaaS architecture, according to at least one embodiment. Service operators 102 can be communicatively coupled to a secure host tenancy 104 that can include a virtual cloud network (VCN) 106 and a secure host subnet 108. In some examples, the service operators 102 may use one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively coupled to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. In response to the request being validated and requiring a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
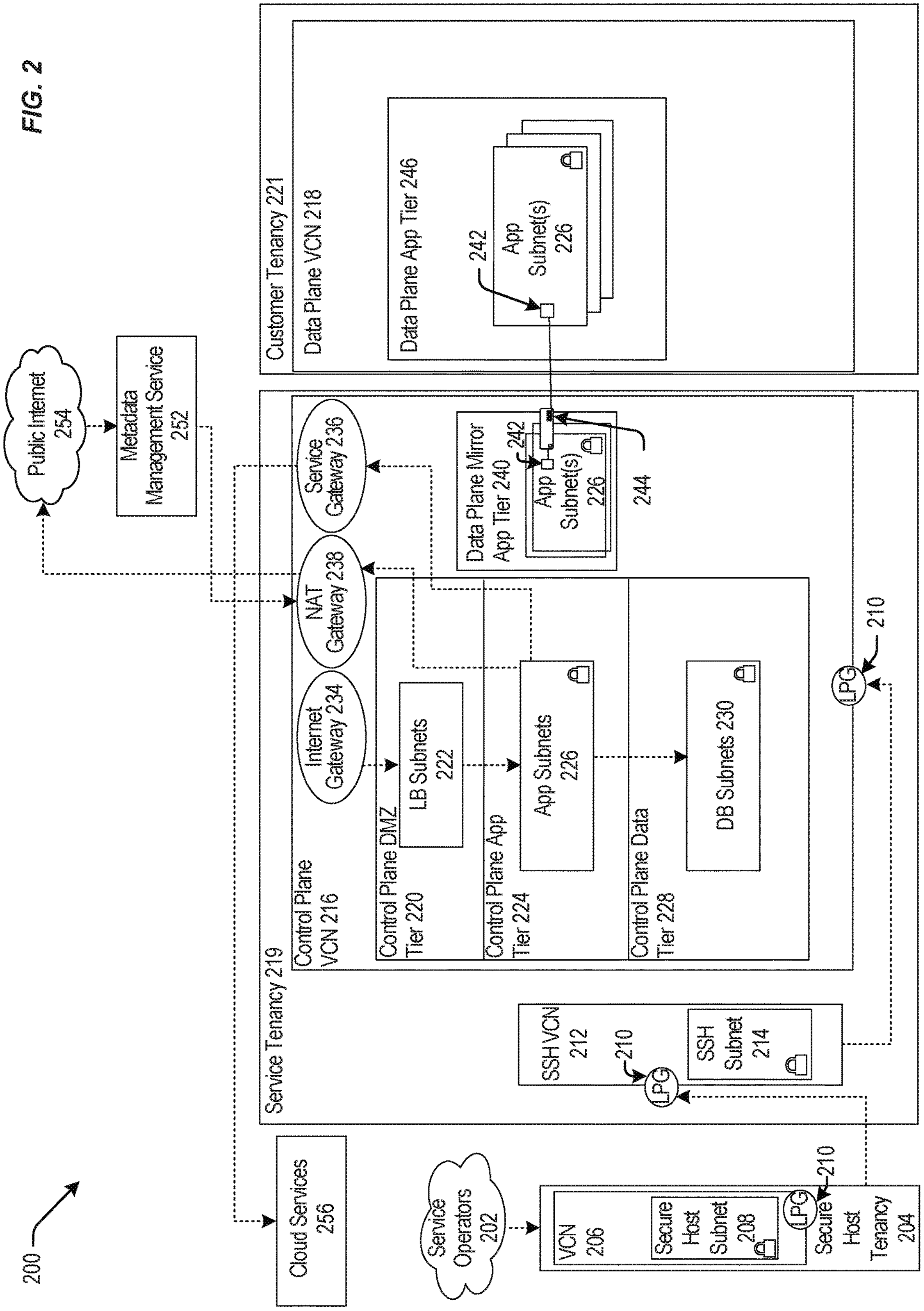
FIG. 2 is a block diagram illustrating an example pattern of an infrastructure as a service architecture.

FIG. 2 is a block diagram 200 illustrating another example pattern of an IaaS architecture, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively coupled to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." In response to a call to Deployment 1 being made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
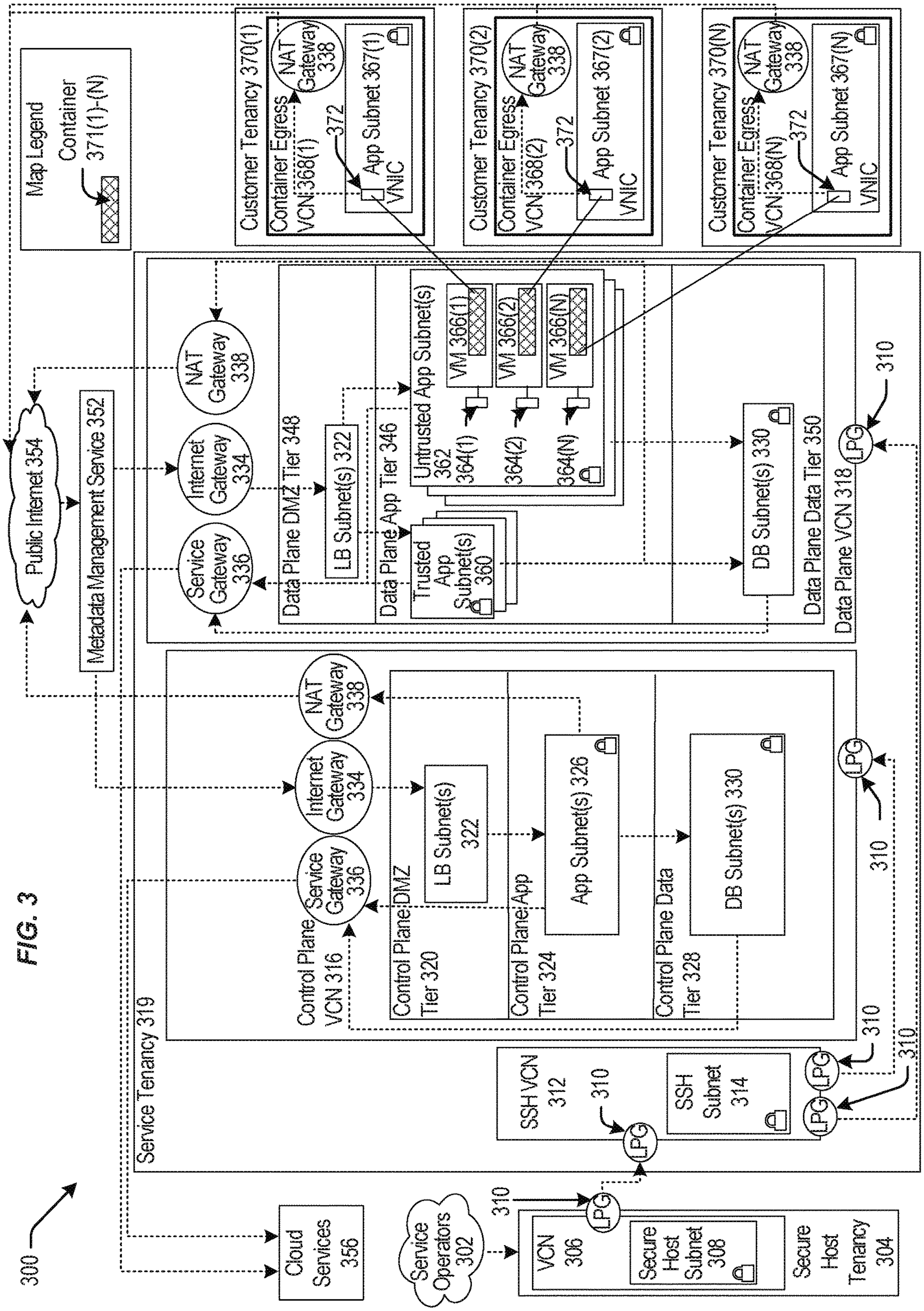
FIG. 3 is a block diagram illustrating an example pattern of an infrastructure as a service architecture.

FIG. 3 is a block diagram 300 illustrating another example pattern of an IaaS architecture, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 370(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively coupled to cloud services 356.

In some embodiments, the data plane VCN 318 can be integrated with customer tenancies 370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 370. Respective containers 371(1)-(N) contained in the VMs 366(1)-(N) may be configured to run the code. In this case, there can be a dual isolation (e.g., the containers 371(1)-(N) running code, where the containers 371(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 371(1)-(N) may be communicatively coupled to the customer tenancy 370 and may be configured to transmit or receive data from the customer tenancy 370. The containers 371(1)-(N) may not be configured to transmit or receive data from any other entity in the data plane VCN 318. Upon completion of running the code, the IaaS provider may kill or otherwise dispose of the containers 371(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 371(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
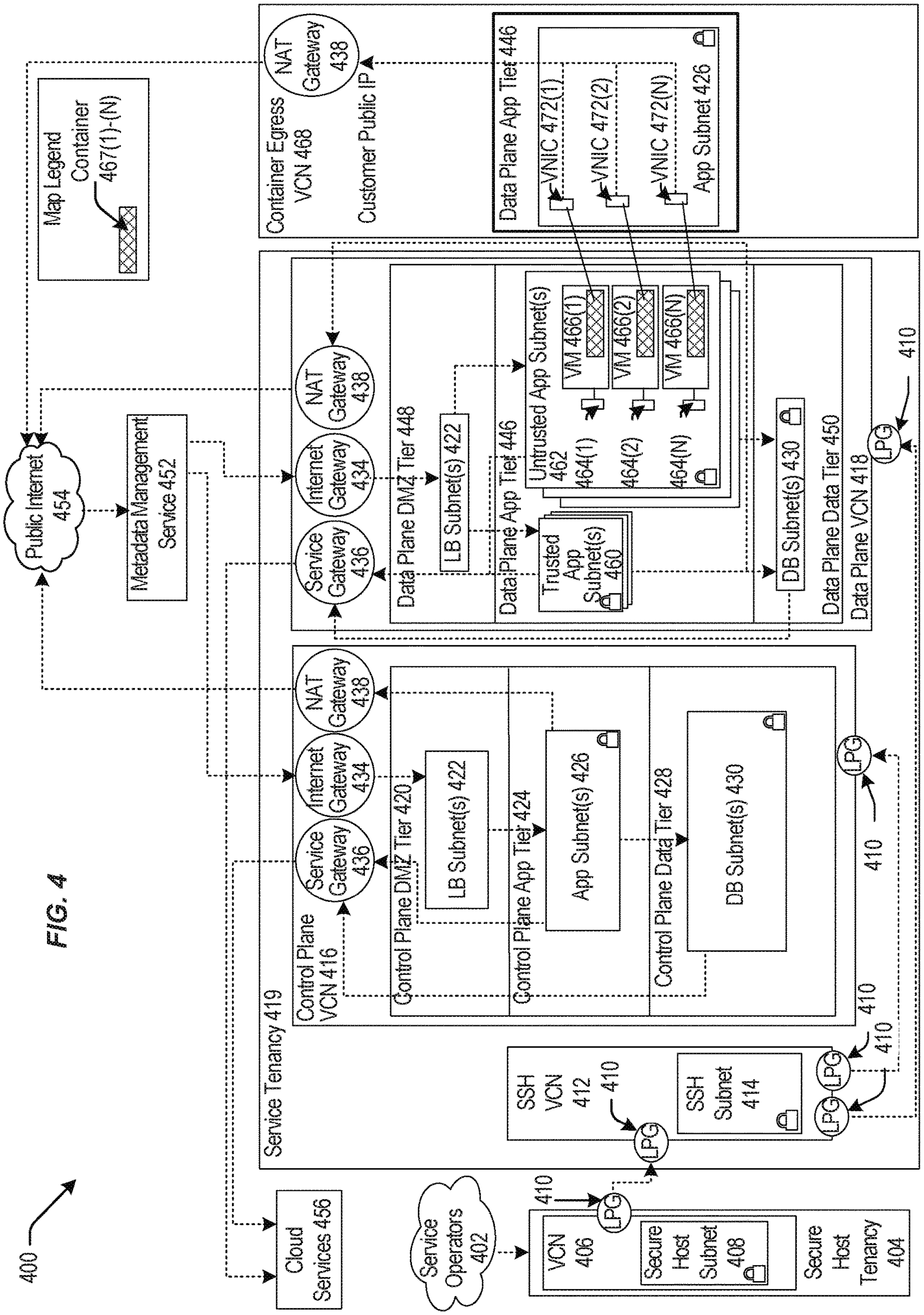
FIG. 4 is a block diagram illustrating an example pattern of an infrastructure as a service architecture.

FIG. 4 is a block diagram 400 illustrating another example pattern of an IaaS architecture, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively coupled to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider when the IaaS provider cannot directly communicate with the customer (e.g., a disconnected region). The respective containers 467(1)-(N) that are contained in the VMs 466(1)-(N) for each customer can be accessed in real-time by the customer. The containers 467 (1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Computer System

Figure 5:
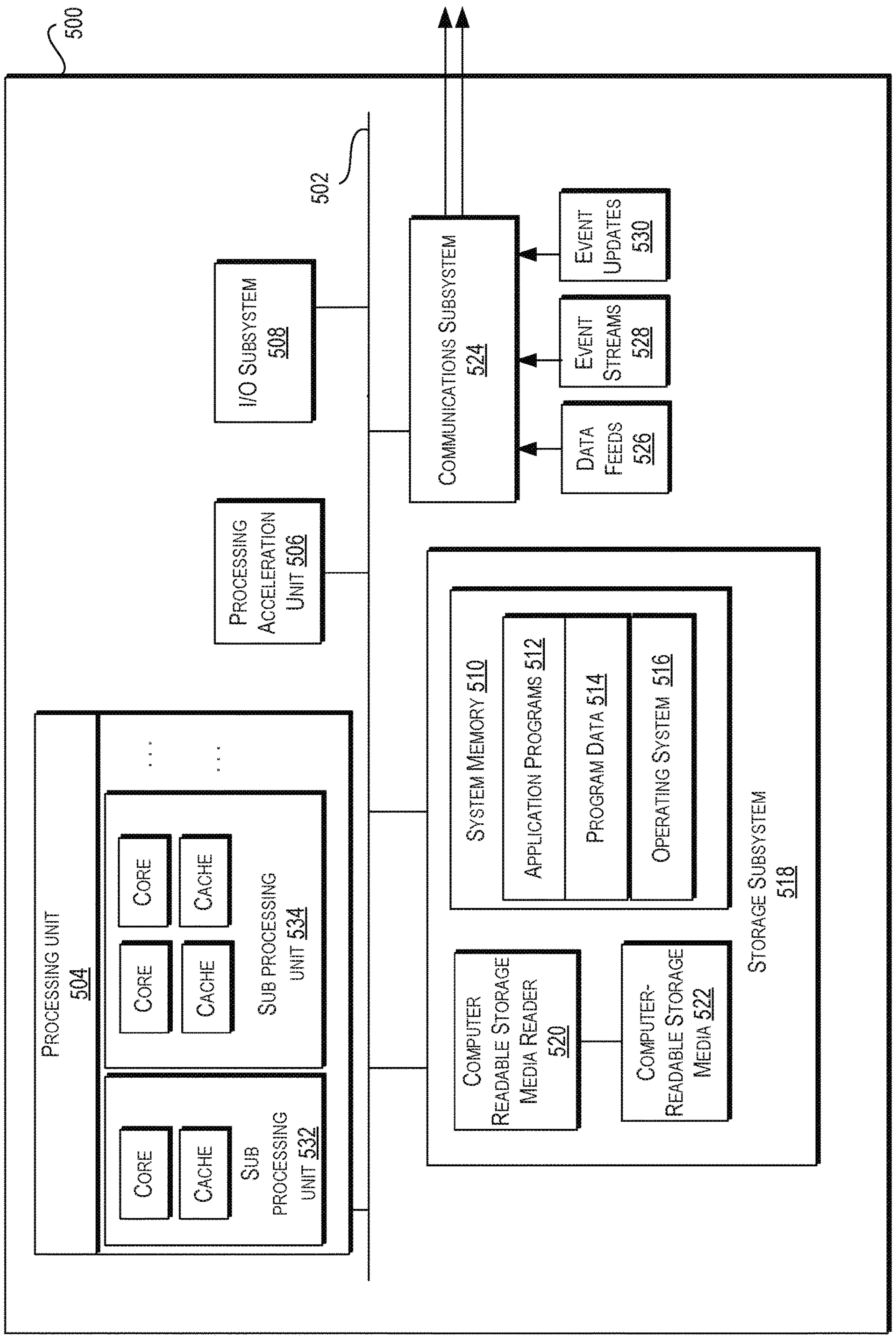
FIG. 5 illustrates an example computer system.

FIG. 5 illustrates an example computer system 500, in which various embodiments described herein may be implemented. The system 500 may be used to implement any of the computer systems described above. As shown in the figure, computer system 500 includes a processing unit 504 that communicates with a number of peripheral subsystems via a bus subsystem 502. These peripheral subsystems may include a processing acceleration unit 506, an input/output (I/O) subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processor(s) 504 and/or in storage subsystem 518. Through suitable programming, processor(s) 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions that are loadable and executable by processing unit 504. System memory

510 may also store data that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random-access memory (RAM)) and/or non-volatile memory (such as read-only memory (ROM), flash memory, etc.). Different types of RAM configurations may be provided including a static random-access memory (SRAM), a dynamic random-access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Subscription and Reclamation Services

Figure 6:
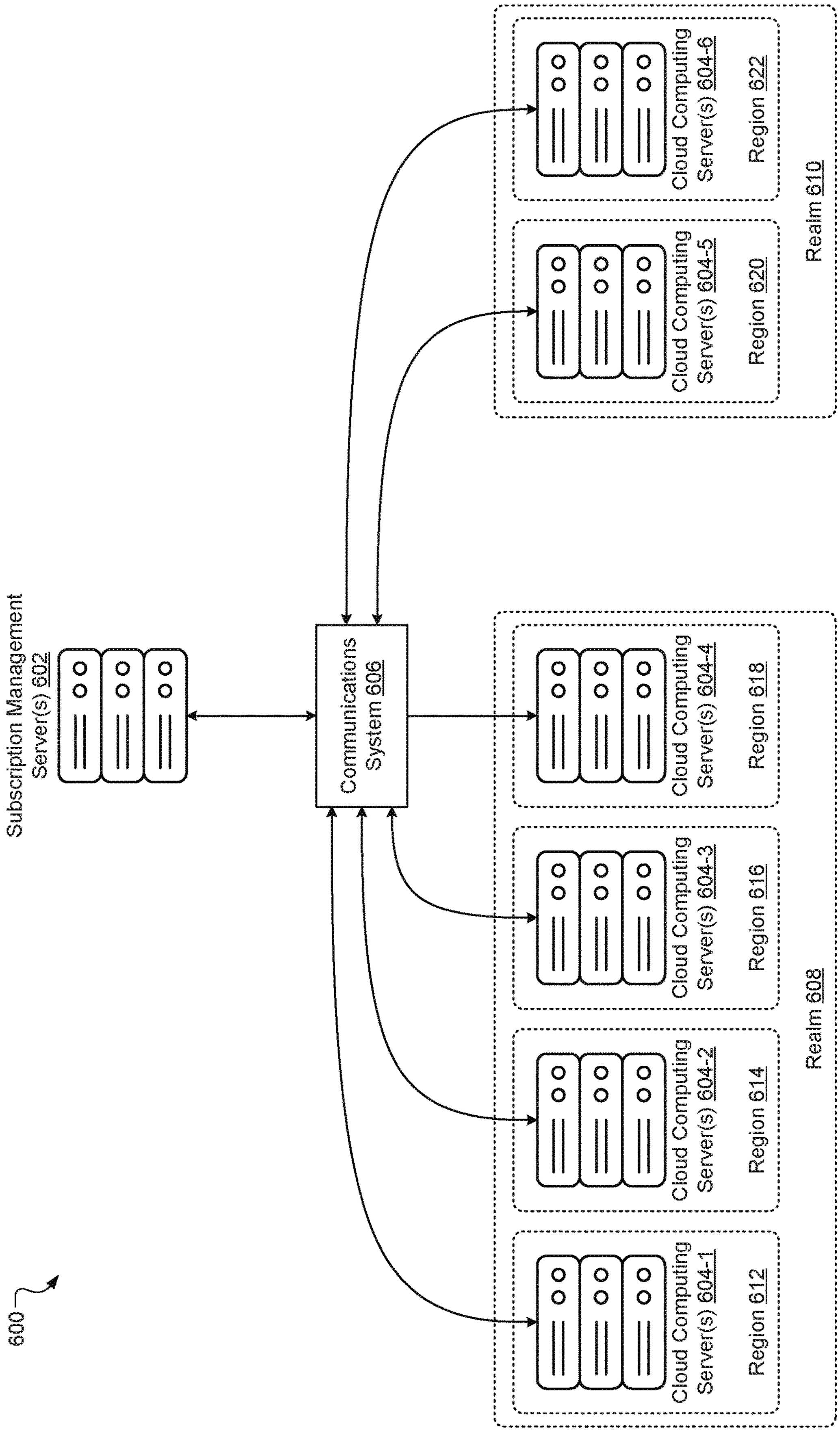
FIG. 6 is a block diagram illustrating an example cloud-based computing system for providing infrastructure as a service.

FIG. 6 is a block diagram illustrating an example cloud-based computing system 600 for providing IaaS services (such as, for example, the IaaS services previously described with reference to FIGS. 1-5). As illustrated in FIG. 6, various implementations of the cloud-based computing system 600 include one or more subscription management server(s) 602 and/or one or more cloud computing server(s) 604 (for example, cloud computing server(s) 604-1, 604-2, 604-3, 604-4, 604-5, and/or 604-6). Although six cloud computing server(s) 604 are illustrated in the example of FIG. 6, the cloud-based computing system 600 may be scaled to include any number of cloud computing server(s) 604. Furthermore, in various implementations, the subscription management server(s) 602 and/or the cloud computing server(s) 604 may each be implemented as a single computing server or a cluster of multiple computing servers. In some examples, the subscription management server(s) 602 and/or the cloud computing server(s) 604 may be implemented as and/or included in the previously described computing system 500.

The subscription management server(s) 602 and the cloud computing server(s) 604 may communicate with one another via a communications system 606. In various implementations, the communications system 606 includes one or more networks, such as a General Packet Radio Service (GPRS) network, a Time-Division Multiple Access (TDMA) network, a Code-Division Multiple Access (CDMA) network, a Global System of Mobile Communications (GSM) network, an Enhanced Data Rates for GSM Evolution (EDGE) network, a High-Speed Packet Access (HSPA) network, an Evolved High-Speed Packet Access (HSPA+) network, a Long Term Evolution (LTE) network, a Worldwide Interoperability for Microwave Access (WiMAX) network, a 5th-generation mobile network (5G), an Internet Protocol (IP) network, a Wireless Application Protocol (WAP) network, or an IEEE 802.11 standards network, as well as any suitable combination of the above networks. In various implementations, the communications system 606 includes an optical network, a local area network, and/or a global communication network, such as the Internet (for example, the public Internet 154, public Internet 254, public Internet 354, and/or public Internet 454 previously described with reference to FIGS. 1-4).

As illustrated in FIG. 6, in some examples, the cloud computing server(s) 604 may be partitioned into one or more realms (such as realm 608 and realm 610). Within each realm, the cloud computing server(s) 604 may be further partitioned into one or more regions. In various implementations, a realm is a broadest level of geographic organization, which segregates cloud resources (e.g., computing resources deployed to cloud computing server(s) 604) on a global scale. Each realm may include one or more regions and may operate independently of other realms. Each region may be a localized geographical area within a realm. For example, each region may include one or more cloud computing server(s) 604 that are deployed in proximity to one another and/or to customers to reduce latency and ensure a high availability of cloud computing services.

In the example of FIG. 6, cloud computing server(s) 604-1 are deployed to region 612 of realm 608, cloud computing server(s) 604-2 are deployed to region 614 of realm 608, cloud computing server(s) 604-3 are deployed to region 616 of realm 608, cloud computing server(s) 604-4 are deployed to region 618 of realm 608, cloud computing server(s) 604-5 are deployed to region 620 of realm 610, and cloud computing server(s) 604-6 are deployed to region 622 of realm 610. While two realms are illustrated in the example of FIG. 6, the cloud-based computing system 600 may include any number of realms. Similarly, while the realm 608 is shown as being partitioned into four regions 612-618 and the realm 610 is shown as being partitioned into two regions 620 and 622, each realm may include any number of regions.

In various implementations, IaaS services (such as, for example, any of the previously described IaaS services) may be provided to customers as part of a subscription. For example, the customer's subscription may allow the customer to access virtual computing resources over a public network. Examples of virtual computing resources include hardware computing resources (such as, for example, the previously described infrastructure components) and/or software computing resources (such as, for example, the previously described deployment software). The set of computing resources associated with a subscription may be deployed to a tenancy and the customer associated with the subscription may be referred to as a tenant. A tenancy may be a partition of resources and/or environments within the cloud-based computing system 600 associated with a subscription. In various implementations, a tenancy may be contained within a single region of a realm. In some examples, a tenancy may span multiple regions of a realm. Some examples of tenancies may include the secure host tenancy 104, service tenancy 119, secure host tenancy 204, service tenancy 219, customer tenancy 221, secure host tenancy 304, service tenancy 319, customer tenancy 370, secure host tenancy 404, and/or service tenancy 419 previously described with reference to FIGS. 1-4.

Examples of computing resources that may be deployed to a tenancy include compute resources (such as, for example, virtual machines, bare metal servers, graphics processing unit [GPU] instances, etc.), storage resources (such as, for example, block storage systems, object storage systems, file storage systems, etc.), networking resources (such as, for example, virtual cloud networks [VCNs], load balancers, content delivery networks [CDNs], etc.), and/or specialized resources (such as, for example, high-performance computing clusters, etc.). The computing resources deployed to a tenancy may include hardware components and/or software components. Examples of hardware components include hardware components of computer servers, GPUs, storage devices, networking hardware, etc. Examples of software components include operating systems, database software, development tools, software development kits (SDKs), security software, networking software, etc.

Figure 7:
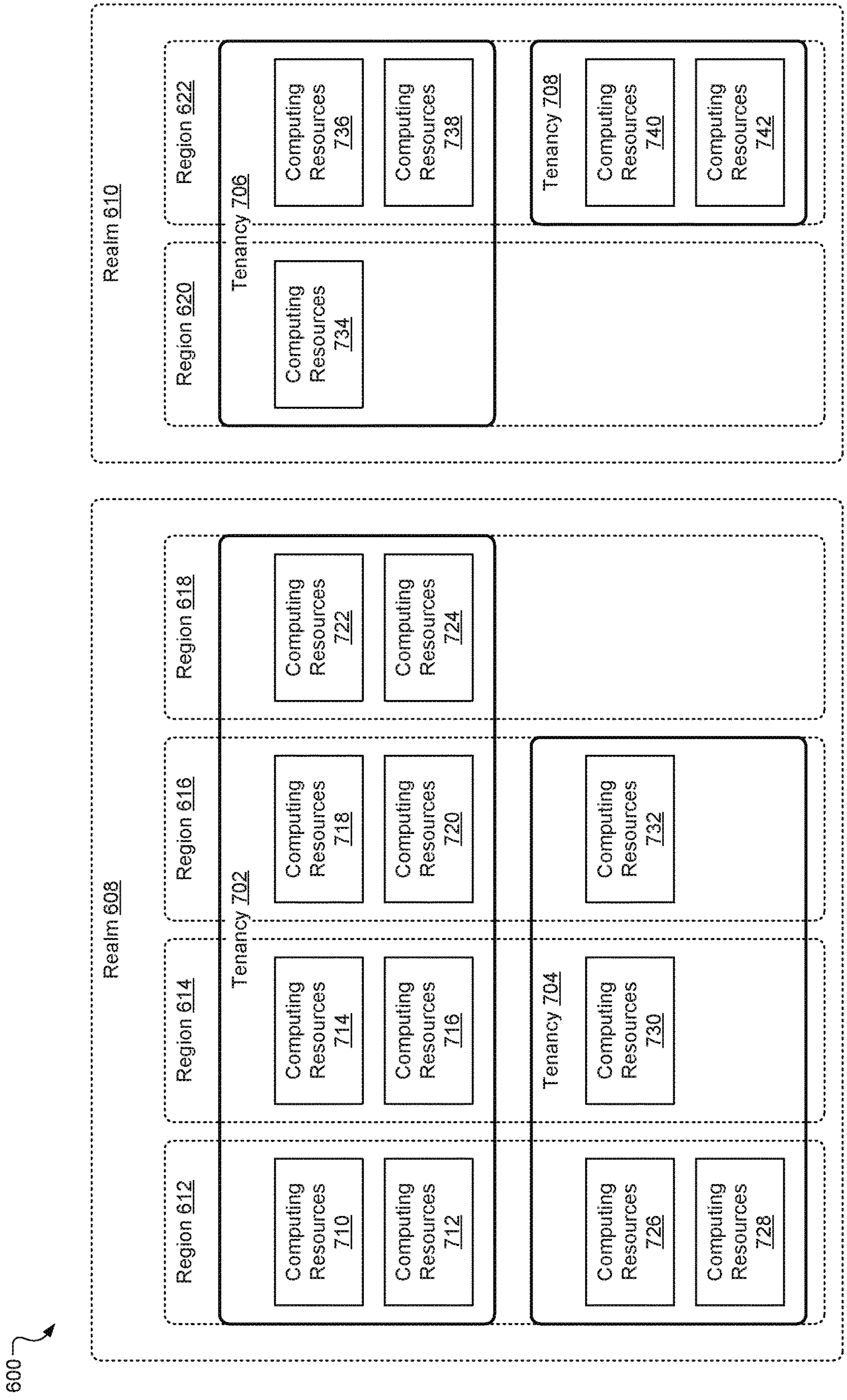
FIG. 7 illustrates example deployments of computing resources in a cloud-based computing system.

FIG. 7 illustrates example deployments of computing resources in the cloud-based computing system 600. The example of FIG. 7 illustrates tenancy 702 and tenancy 704 being deployed within realm 608, and tenancy 706 and tenancy 708 being deployed within realm 610. Tenancy 702 spans across four regions 612, 614, 616, and 618 within realm 608. Tenancy 704 spans across three regions 612, 614, and 616 within realm 608. Tenancy 706 spans across two regions 620 and 622 within realm 610. Tenancy 708 spans across a single region 622 within realm 610. The computing resources 710-724 are deployed to tenancy 702, the computing resources 726-732 are deployed to tenancy 704, the computing resources 734-738 are deployed to tenancy 706, and the computing resources 740 and 742 are deployed to tenancy 708. In various implementations, each tenancy may be associated with a subscription. Thus, the computing resources 710-724 may be associated with a first subscription, the computing resources 726-732 may be associated with a second subscription, the computing resources 734-738 may be associated with a third subscription, and the computing resources 740-742 may be associated with a fourth subscription.

In examples where the tenancy spans across multiple regions, one region may be a home region, while the remaining regions may be local regions. A home region may function as a central hub for managing identity and access management (IAM) resources (such as, for example, users, groups, and/or policies) for all regions of the tenancy (such as, for example, any additional local regions that the tenancy spans). In various implementations, a tenancy is initially deployed to a single region and subsequently expanded to span across additional regions. In such examples, the initial region to which the tenancy is deployed may be the home region. In various implementations, the home region of a tenancy can be reassigned to another region. In examples where the tenancy spans across a single region, the single region is the home region.

Figure 8:
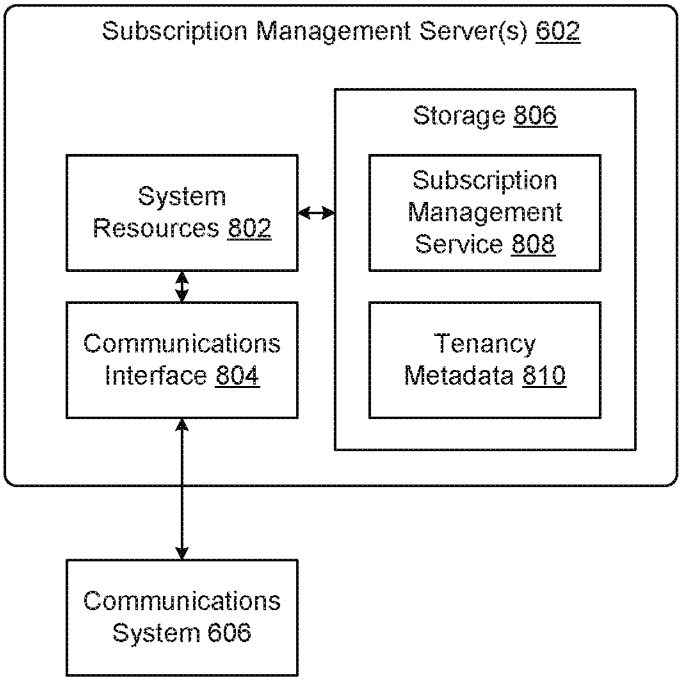
FIG. 8 is a block diagram illustrating an example of a subscription management server.

FIG. 8 is a block diagram illustrating an example of a subscription management server(s) 602. In various implementations, the subscription management server(s) 602 include system resources 802, a communications interface 804, and non-transitory computer-readable storage media such as, for example, storage 806. The non-transitory computer-readable storage media may contain instructions that, when executed, cause an electronic processor to perform various functions described herein. In some examples, the system resources 802 include one or more electronic processors, one or more graphics processing units, volatile computer memory, non-volatile computer memory, and/or one or more system buses interconnecting the components of the subscription management server(s) 602. In various implementations, the communications interface 804 includes hardware and software components that communicate with other devices, platforms, servers, and/or systems over the communications system 606. For example, the communications interface 804 may include one or more transceivers for sending and/or receiving data over the communications system 606.

The storage 806 may include a subscription management service 808 and/or tenancy metadata 810. The subscription management service 808 may manage the lifecycle and/or administrative aspects of a customer's subscription. In various implementations, the subscription management service 808 generates or transmits lifecycle events for the subscription. In some examples, the subscription management service 808 receives a lifecycle message from an external service (such as, for example, a billing service) and retransmits the lifecycle message as the lifecycle event or transmits an indication of the lifecycle message as the lifecycle event. Thus, the subscription management service 808 may consume and/or generate lifecycle events for the subscription.

In various implementations, the lifecycle events include an activate event, an update event, a suspend event, a resume event, and/or a terminate event for a subscription. However, in some examples, fewer or additional events may be used by the subscription management service 808. The subscription management service 808 may generate and/or transmit the activate event when a new subscription is activated and/or a new tenancy is created. The subscription management service 808 may generate and/or transmit the update event when computing resources are added or removed from the subscription and/or tenancy, and/or when the start and/or end dates of the subscription are adjusted. The subscription management service 808 may generate the suspend event to stop and/or prevent the customer from accessing computing resources of the subscription and/or tenancy (for example, in a non-destructive and/or reversable manner). In various implementations, the subscription management service 808 generates the suspend event in response to customer non-payment for the subscription.

The subscription management service 808 may generate and/or transmit the terminate event to reclaim computing resources of the subscription and/or tenancy. In some examples, the subscription management service 808 may generate and/or transmit the suspend event in response to customer non-payment for the subscription, then generate and/or transmit the terminate event after a period of time elapses from when the suspend event was generated (for example, 30, 45, 60, or 90 days). In various implementations, the subscription management service 808 generates and/or transmits a sequence of lifecycle events and transmit a next lifecycle event in the sequence in response to a confirmation of success of a previous lifecycle event. For example, the sequence may include a suspend event followed by a terminate event, and the subscription management service 808 may generate the terminate event in response to a successful completion of actions associated with the suspend event.

The tenancy metadata 810 may indicate which regions the computing resources of a subscription are deployed to (e.g., which regions the tenancy associated with the subscription spans). For example, the tenancy metadata 810 may indicate a home region of the subscription and/or tenancy and, in examples where the tenancy spans multiple regions, any local regions of the subscription and/or tenancy. The subscription management service 808 may access the tenancy metadata 810 to determine which regions the tenancy spans and broadcast the lifecycle events to cloud computing server(s) 604 in regions that the tenancy is deployed to. In various implementations, the subscription management service 808 broadcasts the lifecycle events to the cloud computing server(s) 604 in the home region of the tenancy. In some examples, the subscription management service 808 broadcasts the lifecycle events to the cloud computer server(s) 604 in the home region and any local regions of the tenancy. Additional functionality of the subscription management service 808 is described with reference to the message sequence charts and flowcharts.

Figure 9:
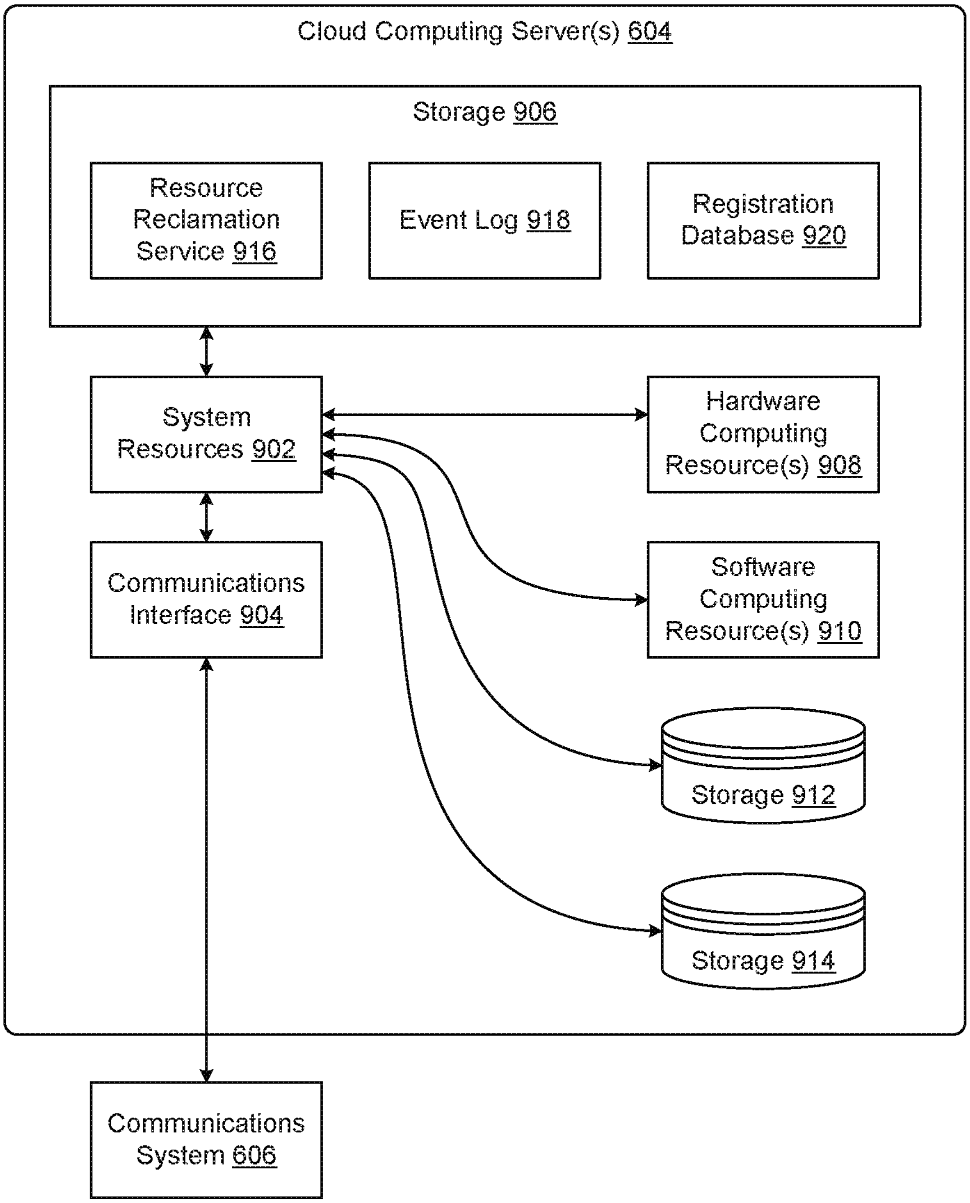
FIG. 9 is a block diagram illustrating an example of a cloud computing server.

FIG. 9 is a block diagram illustrating an example of a cloud computing server(s) 604. In various implementations, the cloud computer server(s) 604 include system resources 902, a communications interface 904, and non-transitory computer-readable storage media such as, for example, storage 906. The non-transitory computer-readable storage media may contain instructions that, when executed, cause an electronic processor to perform various functions described herein. In some examples, the system resources 902 include one or more electronic processors, one or more graphics processing units, volatile computer memory, non-volatile computer memory, and/or one or more system buses interconnecting the components of the cloud computing server(s) 604. In various implementations, the communications interface 904 includes hardware and software components that communicate with other devices, platforms, servers, and/or systems over the communications system 606. For example, the communications interface 904 may include one or more transceivers for sending and/or receiving data over the communications system 606.

The cloud computing server(s) 604 may include computing resources (such as, for example, hardware computing resource(s) 908 and/or software computing resource(s) 910) assigned to and/or assignable to a subscription (e.g., by being deployed to a tenancy). In various implementations, the cloud computing server(s) 604 includes a storage 912 and a storage 914. The storage 912 may be a more performant hot storage and the storage 914 may be a less performant cold storage. Hot storage may be optimized for low-latency and/or high-throughput access, while cold storage may be a less performant form of storage optimized for cost-effectiveness, making cold storage especially suitable for longer-term data retention at lower cost. Examples of hot storage include solid state drives (SSDs), data stored in RAM, flash memory arrays, etc. Examples of cold storage include hard disk drives, magnetic tape storage, etc.

The storage 906 may include a resource reclamation service 916, an event log 918, and/or a registration database 920. The resource reclamation service 916 may receive lifecycle events from the subscription management service 808 and manage the hardware computing resource(s) 908 and/or the software computing resource(s) 910 according to the lifecycle events. In various implementations, an instance of the resource reclamation service 916 transmits indications of the lifecycle events to other instances of the resource reclamation service(s) 916 deployed at other cloud computing server(s) 604. In some examples, an instance of the resource reclamation service 916 transmits indications of the lifecycle events to itself. In various implementations, the resource reclamation service 916 manages the hardware computing resource(s) 908 and/or the software computing resource(s) 910 according to the indications of the lifecycle events. In various implementations, the resource reclamation service 916 adds each lifecycle event received from the subscription management service 808 to the event log 918. In some examples, the event log 918 is a rolling log or a rolling window log that maintains a sliding window of history. For example, the event log 918 may maintain lifecycle events for a fixed duration (e.g., for a period of time in a range of about one day to about one year) such that lifecycle events that fall outside the period of time are archived or deleted from the event log 918.

In various implementations, the resource reclamation service 916 registers computing resources (for example, when the computing resources are created and/or deployed within a tenancy). In some examples, the registration process includes generating registration information. The registration information may include dependencies for each computing resource. For example, the dependencies of a computing resource may include the other computing resources that the computing resource require to function properly. In various implementations, the resource reclamation service 916 saves the registration information to the registration database 920. For example, during the registration (or onboarding) process, each computing resource may report other computing resources that it depends on and/or other computing resources that depend on it to the resource reclamation service 916, and the resource reclamation service 916 may track these dependencies by saving them to the registration database 920. In some examples, the resource reclamation service 916 generates a set of dependencies for the computing resources based on the registration information. The set of dependencies may include dependency information for a set of computing resources. For example, the set of dependencies may include dependencies between the various computing resources within the set of computing resources. In various implementations, the resource reclamation service 916 saves the set of dependencies to the registration database.

In various implementations, the resource reclamation service 916 generates the registration information and/or the set of dependencies for computing resources within the region the resource reclamation service 916 is deployed to. In some examples, the resource reclamation service 916 generates the registration information and/or the set of dependencies for computing resources deployed to the tenancy. In various implementations, the resource reclamation service 916 generates the registration information and/or the set of dependencies for computing resources deployed to the tenancy within the region the resource reclamation service 916 is deployed to.

In various implementations, the various computing resources may be deployed to or as a part of a variety of different services (e.g., any of the previously described IaaS services, such as, for example, compute services, storage services, network services, database services, etc.). Each computing resource may have and report a different set of dependencies to the resource reclamation service 916 for each service type. In some examples, each service type may have a variety of different configurations (each configuration may be referred to as a "shape"), and each computing resource may report a different set of dependencies to the resource reclamation service 916 for each configuration of each service type. Thus, the resource reclamation service 916 may build a different dependency graph for each service type and/or each configuration of each service type based on the different dependencies reported by the computing resources (e.g., during the registration process).

In some examples, the registration database 920 includes information indicating which regions the tenancy spans. In various implementations, the resource reclamation service 916 accesses the tenancy metadata 810 to determine which regions the tenancy spans. In some examples, the resource reclamation service 916 accesses the tenancy metadata 810 to determine which regions the tenancy spans and adds information indicating which regions the tenancy spans to the registration database 920.

Figure 10:
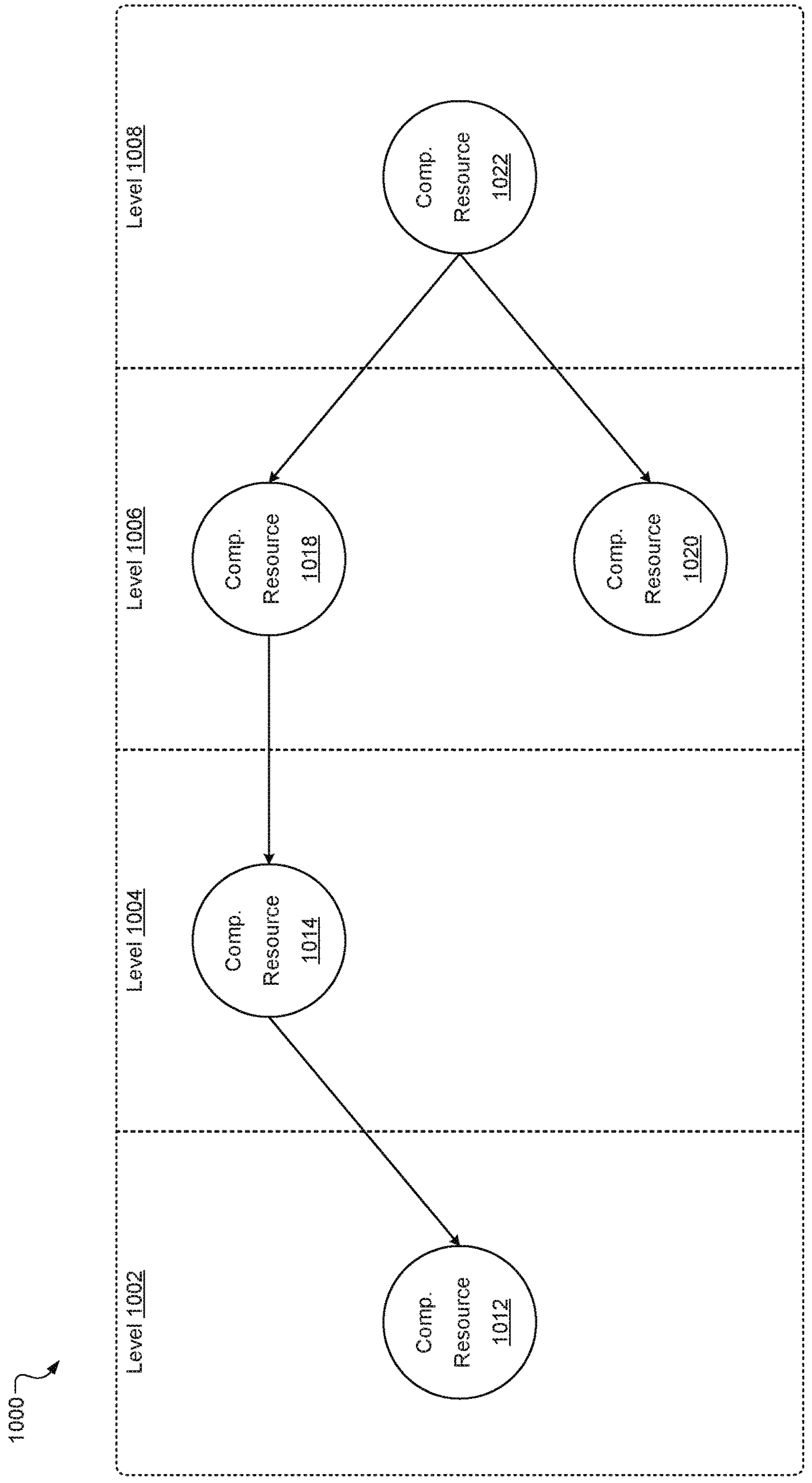
FIG. 10 illustrates an example of a dependency graph generated by a resource reclamation service.

In some examples, the set of dependencies may be defined as a dependency graph. FIG. 10 illustrates an example of a dependency graph 1000 generated by the resource reclamation service 916. In various implementations, the resource reclamation service 916 generates the dependency graph 1000 based on the registration information from the registration database 920. For example, the resource reclamation service 916 generate the dependency graph 1000 based on dependency information from the registration information. The graph 1000 may be divided into one or more levels, such as levels 1002, 1004, 1006, and/or 1008, and one or more nodes representing computing resources (such as computing resources 1012, 1014, 1018, and/or 1020) may be assigned to each level. In some examples, the computing resources within each level do not depend on any other computing resources within the same level. Computing resources within a level may depend on computing resources from another level. In various implementations, the nodes representing computing resources that do not depend on other computing resources are referred to as the roots, while nodes representing computing resources that do not have any dependent computing resources are referred to as leaves. Thus, a level including the computing resources that do not depend on other computing resources (e.g., the roots) may be referred to as the root level while a level including the computing resources that do have dependent computing resources (e.g., the leaves) may be referred to as the leaf level.

As illustrated in FIG. 10, the computing resources may be represented as nodes, while dependencies may be represented as links. While four levels (level 1002, level 1004, level 1006, and level 1008) and five computing resources (computing resource 1012, computing resource 1014, computing resource 1018, computing resource 1020, and computing resource 1022) are illustrated in the example dependency graph 1000, the resource reclamation service 916 may generate a set of dependencies including any number of levels and any number of computing resources (for example, based on the specific configuration of a particular tenancy).

In the example dependency graph 1000, the computing resource 1012 is assigned to the root level 1002 because it does not depend on any other computing resource. The computing resource 1014 is assigned to the next level 1004 because it depends on computing resource 1012. The computing resource 1018 is assigned to the next level 1006 because it depends from computing resource 1014. The computing resource 1020 is assigned to level 1006 (the same level as the computing resource 1018) because computing resource 1022 (of the next level 1008) depends on both computing resource 1018 and computing resource 1020. Because no resources depend on computing resource 1022, it is assigned to the leaf level 1008.

After generating the dependency graph 1000, the resource reclamation service 916 may perform an error-check process on the dependency graph 1000. In various implementations, the error-check process includes determining whether the dependency graph 1000 has any circular dependencies. A circular dependency may occur when a sequence of dependencies forms a closed loop. A sequence of dependencies may refer to an order in which nodes depend on one another. For example, since computing resource 1022 depends on computing resource 1018, computing resource 1018 depends on computing resource 1014, and computing resource 1014 depends on computing resource 1012, computing resources 1012-1022 form a sequence of dependencies.

A sequence of dependencies may form a closed loop (e.g., the dependency graph 1000 may include a circular dependency) when a node in the sequence directly or indirectly depends back on the first node of the sequence. For example, the sequence of computing resources 1012-1022 forms a closed loop (e.g., the dependency graph 1000 includes a circular dependency) when any of computing resources 1012-1018 depends back on computing resource 1022. Restated, a sequence of dependencies forms a closed loop (e.g., a dependency graph includes a circular dependency) when a node within the sequence directly or indirectly depends back on itself. In various implementations, the resource reclamation service 916 generates an error message in response to determining that the dependency graph 1000 includes a circular dependency (e.g., the sequence of computing resources 1012-1022 forms a closed loop). In some examples, the resource reclamation service 916 transmits the error message to the subscription management service 808. In various implementations, the resource reclamation service 916 may be deployed to a local region and transmits the error message to the instance of the resource reclamation service 916 in the home region. The instance of the resource reclamation service 916 in the home region may then transmit the error message to the subscription management service 808. Additional functionality of the resource reclamation service 916 is described with reference to the message sequence charts and flowcharts.

Figure 11:
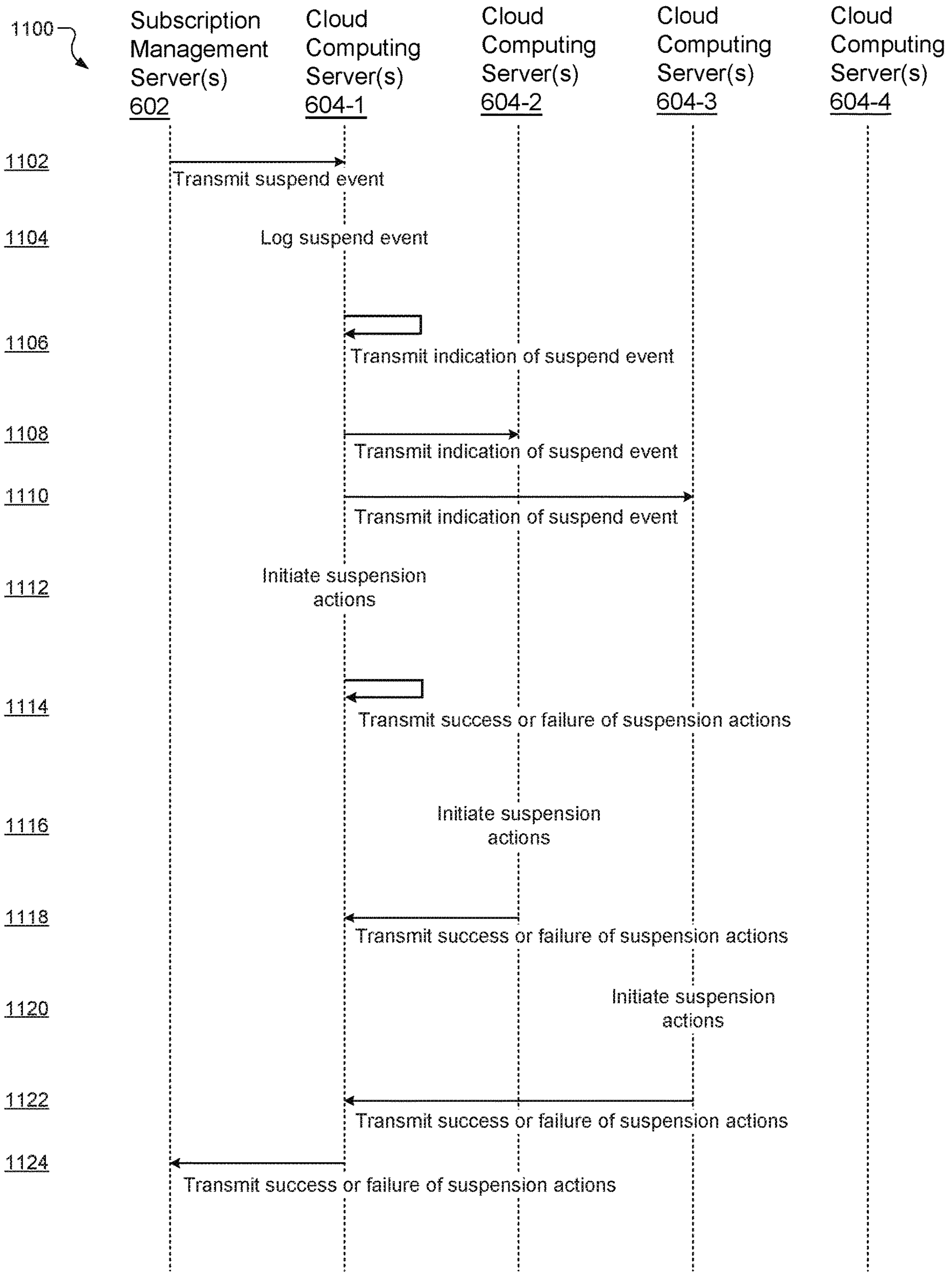
FIG. 11 illustrates a message sequence chart showing example interactions between components of a cloud-based computing system associated with a suspend lifecycle event.

FIG. 11 illustrates a message sequence chart 1100 showing example interactions between components of the cloud-based computing system 600 associated with a suspend lifecycle event. In the example of FIG. 11, the tenancy spans the regions 612-616 of the realm 608, and the region 612 serves as the home region (while the regions 614 and 616 are local regions). However, in other examples, the tenancy may span any number of regions, including only one region. In the message sequence chart 1100, the subscription management service 808 of the subscription management server(s) 602 transmits a suspend event to an instance of the resource reclamation service 916 deployed at the home region cloud computing server(s) 604-1 (at operation 1102). In various implementations, the subscription management service 808 accesses the tenancy metadata 810 to determine which regions the tenancy spans and transmits the suspend event to the cloud computing server(s) 604 in the tenancy's home region. In the message sequence chart 1100, the instance of the resource reclamation service 916 deployed at the home region cloud computing server(s) 604-1 receives the suspend event and adds the suspend event to the event log 918 at the home region cloud computing server(s) 604-1 (at operation 1104).

In various implementations, the instance of the resource reclamation service 916 deployed at the home region cloud computing server(s) 604-1 accesses the registration database 920 and/or the tenancy metadata 810 to determine which regions the tenancy spans and transmits an indication of the suspend event to respective instances of the resource reclamation service 916 in those regions. For example, in the message sequence chart 1100, the instance of the resource reclamation service 916 deployed at the home region cloud computing server(s) 604-1 transmits an indication of the suspend event to itself (at operation 1106). In examples where the tenancy spans one or more local regions in addition to the home region, the instance of the resource reclamation service 916 deployed at the home region cloud computing server(s) 604-1 also transmits the indication of the suspend event to an instance of the resource reclamation service 916 deployed at each respective local region. Because the tenancy is deployed across local regions 614 and 616 in the example of FIG. 11, the instance of the resource reclamation service 916 at the home region cloud computing server(s) 604-1 transmits the indication of the suspend event to an instance of the resource reclamation service 916 deployed at the local region cloud computing server(s) 604-2 (at operation 1108) and to an instance of the resource reclamation service 916 deployed at the local region cloud computing server(s) 604-3 (at operation 1110). As the tenancy does not span the region 618, the instance of the resource reclamation service 916 deployed at the home region cloud computing server(s) 604-1 does not transmit the indication of the suspend event to an instance of the resource reclamation service deployed at the cloud computing server(s) 604-4.

In the message sequence chart 1100, the instance of the resource reclamation service 916 deployed at the home region cloud computing server(s) 604-1 initiates suspension actions in response to receiving the indication of the suspend event (at operation 1112). In various implementations, the suspension actions include reversibly suspending computing resources assigned to the tenancy at the cloud computing server(s) 604 in the region managed by a respective instance of the resource reclamation service 916. Reversibly suspending computing resources may temporarily disable the customer's access to the computing resources and/or temporarily disable the functionality of the computing resources while allowing for the later restoration of the computing resources. For example, the resource reclamation service 916 may reversibly suspend virtual machine instances by saving the state of the virtual machine to storage and halting hardware resource utilization. The virtual machine may be restarted later without data loss. In various implementations, the resource reclamation service 916 may pause database instances so that the database instances do not consume compute resources. In some examples, the resource reclamation service 916 may scale containerized workloads down to zero instances. In various implementations, the resource reclamation service 916 transfers stored data from hotter storage to colder storage.

In various implementations, the instance of the resource reclamation service 916 may suspend a set of computing resources belonging to a tenancy within its region according to a set of dependencies for the computing resources within the region (such as, for example, any of the previously described sets of dependencies). For example, the instance of the resource reclamation service 916 may suspend a subset of computing resources that do not have any dependent resources first (e.g., the computing resources at the leaf level). The resource reclamation service 916 may suspend resources level-by-level proceeding from the leaf level to the root level. In various implementations, the resource reclamation service 916 suspends the computing resources at each level sequentially or in parallel. In some examples, the resource reclamation service 916 does not suspend resources at a next level until all suspension actions at a current level are completed.

For example, referring to the example of FIG. 10, the instance of the resource reclamation service 916 may suspend the computing resource 1022 of the leaf level 1008. The instance of the resource reclamation service 916 determines whether each resource of the leaf level 1008 has been successfully suspended and proceeds to the next level 1006 in response to a determination that each resource of the leaf level 1008 has been successfully suspended. The instance of the resource reclamation service 916 then suspends the computing resources 1018 and 1020 at level 1006. The instance of the resource reclamation service 916 determines whether each resource of the level 1006 has been successfully suspended and proceeds to the next level 1004 in response to a determination that each resource of the level 1006 has been successfully suspended. The instance of the resource reclamation service 916 then suspends the computing resource 1014 and at level 1004. The instance of the resource reclamation service 916 determines whether each resource of the level 1004 has been successfully suspended and proceeds to the root level 1002 in response to a determination that each resource of the level 1004 has been successfully suspended. The instance of the resource reclamation service 916 then suspends the computing resource 1012 at the root level 1002.

Figure 12:
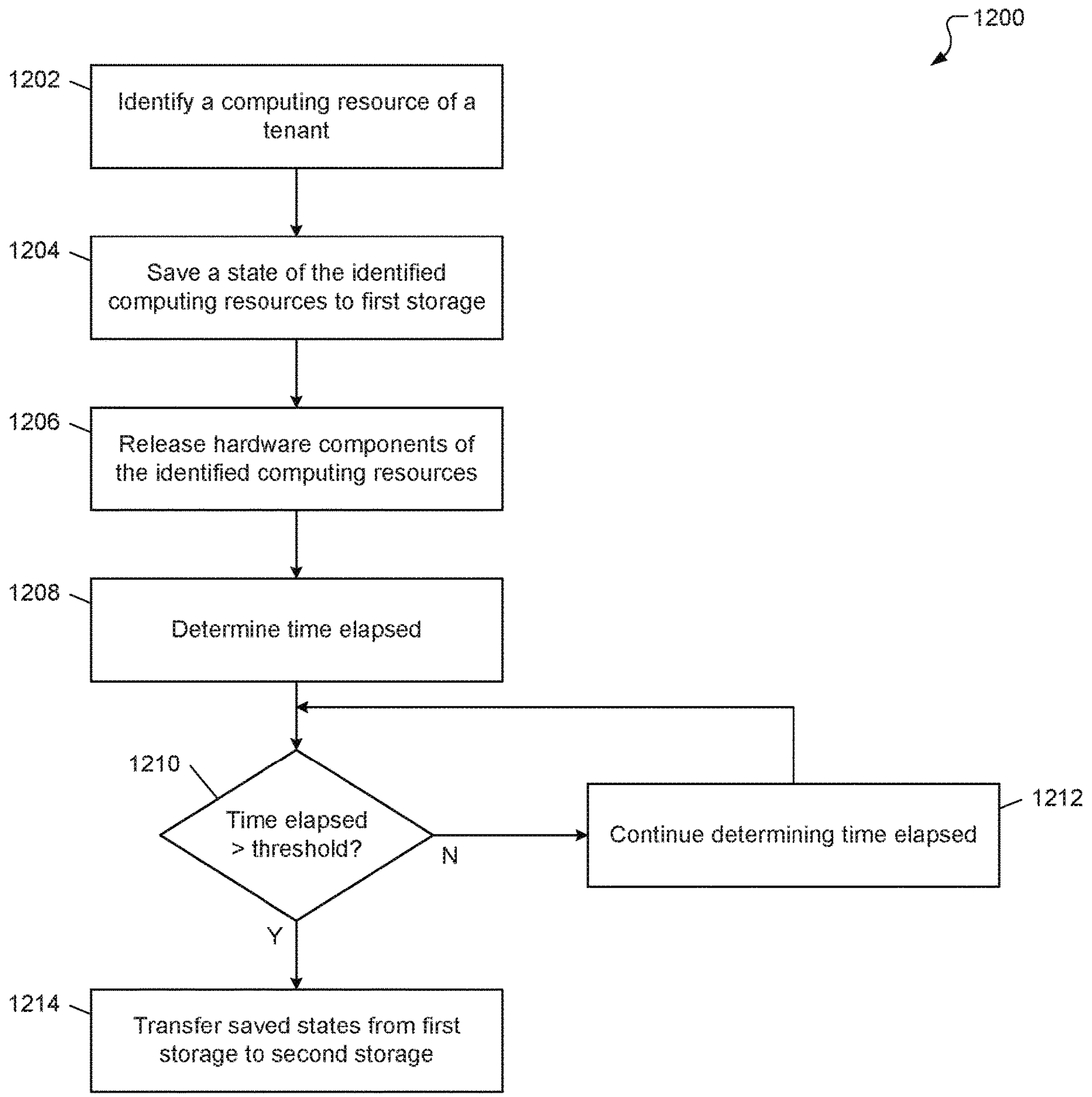
FIG. 12 is a flowchart illustrating an example process for reversibly suspending a computing resource.

FIG. 12 is a flowchart illustrating an example process 1200 for reversibly suspending a computing resource. In the example process 1200, an instance of the resource reclamation service 916 identifies a computing resource of a tenant (at block 1202). For example, the instance of the resource reclamation service 916 uses the tenancy metadata 810 and/or the registration database 920 to identify a computing resource that is deployed to a tenancy associated with the tenant. In various implementations, the tenancy is deployed to the same region as the instance of the resource reclamation service 916. In the example process 1200, the instance of the resource reclamation service 916 saves a state of the identified computing resource to a first storage (at block 1204). For example, the instance of the resource reclamation service 916 saves the state to a hot storage, such as storage 912. In the example process 1200, the instance of the resource reclamation service 916 releases hardware components of the identified computing resources (at block 1206). For example, the hardware components may be released for reassignment to and/or use by another tenancy.

In the example process 1200, the instance of the resource reclamation service 916 determines a time elapsed since the state was saved to the first storage (at block 1208). In various implementations, the resource reclamation service 916 determines the time elapsed since the reclamation sequence (e.g., the message sequence chart 1100) was initiated (e.g., the subscription management service 808 transmitting the suspend event at operation 1102). At decision block 1212, the instance of the resource reclamation service 916 determines whether the time elapsed exceeds a threshold (e.g., whether a defined period of time has elapsed since the state was saved to the first storage). In response to the time elapsed not exceeding a threshold ("NO" at decision block 1210), the instance of the resource reclamation service 916 continues determining the time elapsed since the state was saved to the first storage at decision block 1212 and the example process 1200 returns to decision block 1210. In response to the time elapsed exceeding the threshold ("YES" at decision block 1210), the instance of the resource reclamation service 916 transfers the saved state from the first storage to a second storage (at block 1214). For example, the instance of the resource reclamation service 916 transfers the state from the hot storage 912 to a cold storage, such as storage 914. In various implementations, the resource reclamation service 916 saves the state directly to the cold storage 914 at block 1204, and the process 1200 omits blocks 1204-1214.

Returning to FIG. 11, in some examples, the instance of the resource reclamation service 916 deployed at the home region cloud computing server(s) 604-1 initiates the suspension actions at operation 1112 by performing the process 1200 for one or more of the computing resources of the tenancy at the home region 612. In various implementations, the instance of the resource reclamation service 916 deployed at the home region cloud computing server(s) 604-1 initiates the suspension actions by performing the process 1200 for each computing resource of the tenancy at the home region 612. In the message sequence chart 1100, the instance of the resource reclamation service 916 at the home region cloud computing server(s) 604-1 transmits a success or failure of the suspension actions to itself (at operation 1114).

In various implementations, the instance of the resource reclamation service 916 at the home region cloud computing server(s) 604-1 reports whether each suspension action taken for each computing resource of the tenancy in the home region 612 succeeded or failed. In some examples, the instance of the resource reclamation service 916 at the home region cloud computing server(s) 604-1 reports whether the suspension actions for tenancy in the home region 612 succeeded or failed. In various implementations, the suspension actions for tenancy in the home region 612 succeeds when each suspension action taken for each computing resource succeeds and fails when any suspension action fails.

In the message sequence chart 1100, the instance of the resource reclamation service 916 deployed at the local region cloud computing server(s) 604-2 initiates suspension actions in response to receiving the indication of the suspend event (at operation 1116). For example, the instance of the resource reclamation service 916 deployed at the local region cloud computing server(s) 604-2 suspends computing resources in accordance with a set of dependencies for the tenancy's resources within the region 614 (such as for example, any of the previously described sets of dependencies). For example, the instance of the resource reclamation service 916 may suspend a subset of computing resources that do not have any dependent resources first (e.g., the computing resources at the leaf level). The resource reclamation service 916 may suspend resources level-by-level proceeding from the leaf level to the root level. In various implementations, the resource reclamation service 916 suspends the computing resources at each level sequentially or in parallel. In some examples, the resource reclamation service 916 does not suspend resources at a next level until all suspension actions at a current level are completed.

In various implementations, the instance of the resource reclamation service 916 deployed at the local region cloud computing server(s) 604-2 initiates the suspension actions at operation 1116 by performing the process 1200 for one or more of the computing resources of the tenancy at the local region 614. In some examples, the instance of the resource reclamation service 916 deployed at the local region cloud computing server(s) 604-2 initiates the suspension actions by performing the process 1200 for each computing resource of the tenancy at the local region 614. In the message sequence chart 1100, the instance of the resource reclamation service 916 at the local region cloud computing server(s) 604-2 transmits a success or failure report of the suspension actions to the instance of the resource reclamation service 916 at the home region cloud computing server(s) 604-1 (at operation 1118).

In various implementations, the instance of the resource reclamation service 916 at the local region cloud computing server(s) 604-2 reports whether each suspension action taken for each computing resource of the tenancy in the local region 614 succeeded or failed. In some examples, the instance of the resource reclamation service 916 at the local region cloud computing server(s) 604-2 reports whether the suspension actions for tenancy in the local region 614 succeeded or failed. In various implementations, the suspension actions for tenancy in the local region 614 succeeds when each suspension action taken for each computing resource succeeds and fails when any suspension action fails.

In the message sequence chart 1100, the instance of the resource reclamation service 916 deployed at the local region cloud computing server(s) 604-3 initiates suspension actions in response to receiving the indication of the suspend event (at operation 1120). For example, the instance of the resource reclamation service 916 deployed at the local region cloud computing server(s) 604-3 suspends computing resources in accordance with a set of dependencies for the tenancy's resources within the region 616 (such as, for example, any of the previously described sets of dependencies). For example, the instance of the resource reclamation service 916 may suspend a subset of computing resources that do not have any dependent resources first (e.g., the computing resources at the leaf level). The resource reclamation service 916 may suspend resources level-by-level proceeding from the leaf level to the root level. In various implementations, the resource reclamation service 916 suspends the computing resources at each level sequentially or in parallel. In some examples, the resource reclamation service 916 does not suspend resources at a next level until all suspension actions at a current level are completed.

In various implementations, the instance of the resource reclamation service 916 deployed at the local region cloud computing server(s) 604-3 initiates the suspension actions at operation 1120 by performing the process 1200 for one or more of the computing resources of the tenancy at the local region 616. In some examples, the instance of the resource reclamation service 916 deployed at the local region cloud computing server(s) 604-3 initiates the suspension actions by performing the process 1200 for each computing resource of the tenancy at the local region 614. In the message sequence chart 1100, the instance of the resource reclamation service 916 at the local region cloud computing server(s) 604-3 transmits a success or failure report of the suspension actions to the instance of the resource reclamation service 916 at the home region cloud computing server(s) 604-1 (at operation 1122).

In various implementations, the instance of the resource reclamation service 916 at the local region cloud computing server(s) 604-3 reports whether each suspension action taken for each computing resource of the tenancy in the local region 616 succeeded or failed. In some examples, the instance of the resource reclamation service 916 at the local region cloud computing server(s) 604-3 reports whether the suspension actions for tenancy in the local region 616 succeeded or failed. In various implementations, the suspension actions for tenancy in the local region 616 succeeds when each suspension action taken for each computing resource succeeds and fails when any suspension action fails.

In the message sequence chart 1100, the instance of the resource reclamation service 916 deployed at the home region cloud computing server(s) 604-1 transmits a success or failure report of the suspension actions across the tenancy to the subscription management service 808 of the subscription management server(s) 602 (at operation 1124). In various implementations, the instance of the resource reclamation service 916 deployed at the home region cloud computing server(s) 604-1 transmits an overall success or failure report of the suspension actions across the tenancy. For example, the instance of the resource reclamation service 916 deployed at the home region cloud computing server(s) 604-1 transmits an overall success report of the suspension actions across the tenancy when the suspension actions for the tenancy in each of the regions 612-616 that the tenancy spans is successful and reports an overall failure of the suspension actions when any of the regions 612-616 fails. In some examples, the instance of the resource reclamation service 916 deployed at the home region cloud computing server(s) 604-1 transmits a success or failure report of the suspension actions for each of the regions 612-616 that the tenancy spans. In various implementations, the instance of the resource reclamation service 916 deployed at the home region cloud computing server(s) 604-1 transmits a success or failure report of the suspension actions for each computing resource of tenancy.

In various implementations, the subscription management service 808 of the subscription management server(s) 602 may transmit a cancel request to interrupt the suspension actions. For example, the subscription management service 808 of the subscription management server(s) 602 may transmit the cancel to the instance of the resource reclamation service 916 deployed at the home region cloud computing server(s) 604-1, and the instance of the resource reclamation service 916 transmits an indication of the cancel request to respective instances of the resource reclamation service 916 in the regions of the tenancy. In response to receiving the indication of the cancel request, the respective instances of the resource reclamation service 916 may interrupt ongoing suspension actions in each respective region.

Figure 13:
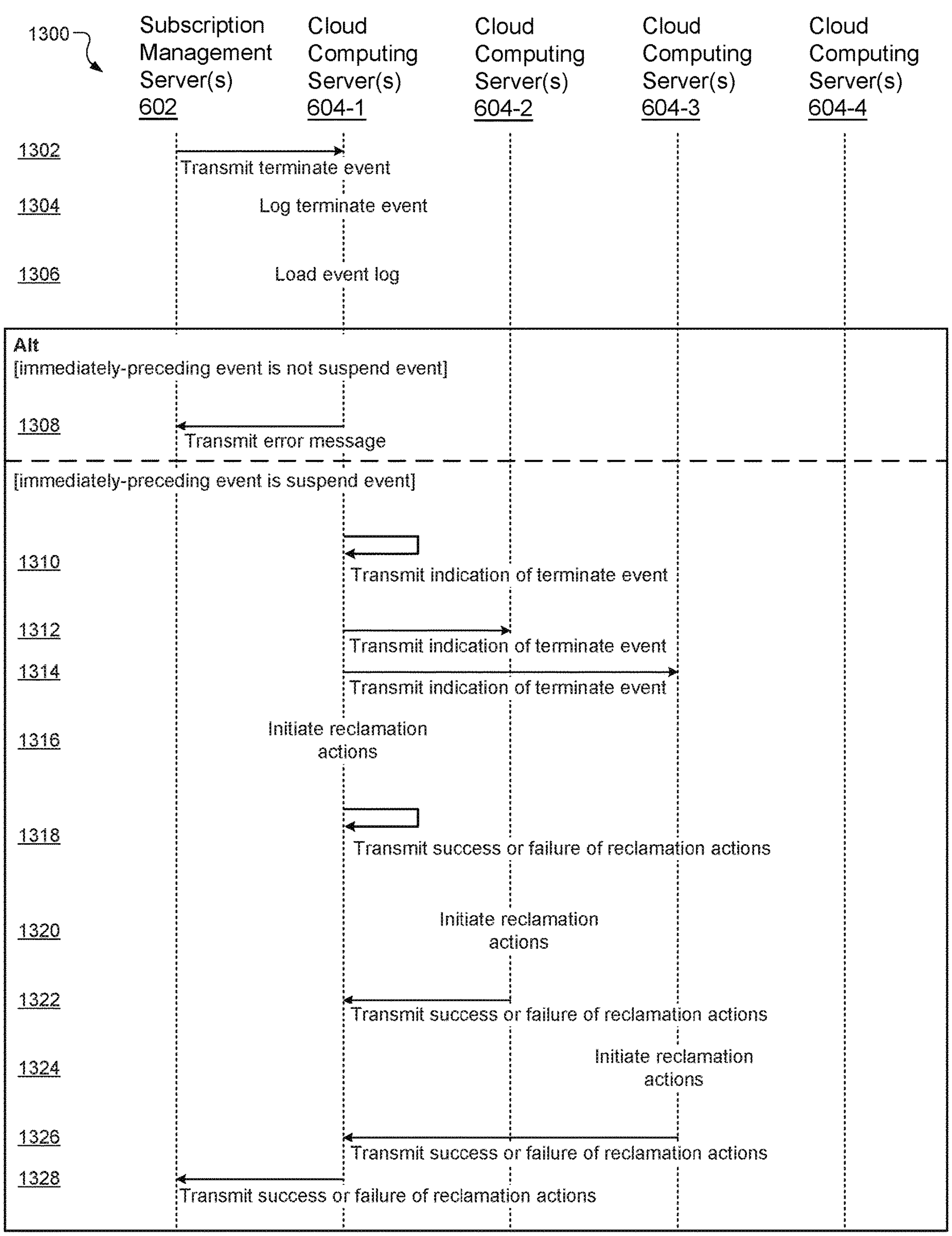
FIG. 13 illustrates a message sequence chart showing example interactions between components of a cloud-based computing system associated with a terminate lifecycle event.

FIG. 13 illustrates a message sequence chart 1300 showing example interactions between components of the cloud-based computing system 600 associated with a terminate lifecycle event. In the example of FIG. 13, the tenancy spans the regions 612-616 of the realm 608, and the region 612 serves as the home region (while the regions 614 and 616 are local regions). However, in other examples, the tenancy may span any number of regions, including only one region. In the message sequence chart 1300, the subscription management service 808 of the subscription management server(s) 602 transmits a terminate event to the instance of the resource reclamation service 916 deployed at the home region cloud computing server(s) 604-1 (at operation 1302). In various implementations, the subscription management service 808 accesses the tenancy metadata 810 to determine which regions the tenancy spans and transmits the terminate event to the cloud computing server(s) 604 in the tenancy's home region. In the message sequence chart 1300, the instance of the resource reclamation service 916 deployed at the home region could computing server(s) 604-1 receives the terminate event and adds the terminate event to the event log 918 at the home region cloud computing server(s) 604-1 (at operation 1304).

In the message sequence chart 1300, the instance of the resource reclamation service 916 deployed at the home region computing server(s) 604-1 loads the event log 918 (at operation 1306). The instance of the resource reclamation service 916 deployed at the home region computing server(s) 604-1 determines whether the immediately preceding event from the terminate event logged at operation 1304 is a suspend event. In response to determining that the immediately preceding event from the terminate event logged at operation 1304 is not a suspend event, the instance of the resource reclamation service 916 deployed at the home region computing server(s) 604-1 transmits an error message to the subscription management service 808 of the subscription management server(s) 602 (at operation 1308). In response to determining that the immediately preceding event is a suspend event, the instance of the resource reclamation service 916 deployed at the home region computing server(s) 604-1 transmits an indication of the terminate event to an instance of the resource reclamation service 916 in each region that the tenancy spans.

In various implementations, instead of or in addition to determining whether the immediately preceding event logged at operation 1304 is a suspend event, the instance of the resource reclamation service 916 deployed at the home region computing server(s) 604-1 determines whether the suspend event occurred (e.g., was added to the event log 918) within a defined period of time. In response to determining that the suspend event did not occur within the defined period of time, the instance of the resource reclamation service 916 deployed at the home region computing server(s) 604-1 transmits the error message to the subscription management service 808 of the subscription management server(s) 602 (at operation 1308). In response to determining that the suspend event occurred within the defined period of time, the instance of the resource reclamation service 916 deployed at the home region computing server(s) 604-1 transmits an indication of the terminate event to an instance of the resource reclamation service 916 in each region that the tenancy spans.

In various implementations, the instance of the resource reclamation service 916 deployed at the home region cloud computing server(s) 604-1 accesses the registration database 920 and/or the tenancy metadata 810 to determine which regions the tenancy spans and transmits the indication of the terminate event to respective instances of the resource reclamation service 916 in those regions. For example, in the message sequence chart 1300, the instance of the resource reclamation service 916 deployed at the home region computing server(s) 604-1 transmits the indication of the terminate event to itself (at operation 1310). In the message sequence chart 1300, the instance of the resource reclamation service 916 deployed at the home region computing server(s) 604-1 transmits the indication of the terminate event to the instance of the resource reclamation service 916 deployed at the local region cloud computing server(s) 604-2 (at operation 1312). In the message sequence chart 1300, the instance of the resource reclamation service 916 deployed at the home region computing server(s) 604-1 transmits the indication of the terminate event to the instance of the resource reclamation service 916 deployed at the local region cloud computing server(s) 604-3 (at operation 1314). However, because the tenancy does not span the region 618, the instance of the resource reclamation service 916 deployed at the home region computing server(s) 604-1 does not transmit the indication of the terminate event to the instance of the resource reclamation service deployed at the cloud computing server(s) 604-4.

In the message sequence chart 1300, the instance of the resource reclamation service 916 deployed at the home region computing server(s) 604-1 initiates reclamation actions in response to receiving the indication of the terminate event (at operation 1316). In various implementations, the resource reclamation service 916 performs reclamation actions by deleting software computing resources (such as by discarding any saved states, stored data, etc.) and/or releasing hardware computing resources for use by other tenants. In some examples, the instance of the resource reclamation service 916 may reclaim a set of computing resources belonging to a tenancy within its region according to a set of dependencies for the computing resources within the region (such as, for example, any of the previously described sets of dependencies). For example, the resource reclamation service 916 may reclaim a subset of the computing resources that do not have dependent resources first (e.g., the computing resources at the leaf level).

The resource reclamation service 916 may reclaim resources level-by-level proceeding from the leaf level to the root level. In various implementations, the resource reclamation service 916 reclaims computing resources at each level sequentially or in parallel. In some examples, the resource reclamation service 916 does not reclaim resources at a next level until all reclamation actions at a current level are completed. In various implementations, the resource reclamation service 916 may reclaim a computing resource by transmitting a reclamation request to the computing resource. The computing resource may transmit a confirmation back to the resource reclamation service 916 indicating that the computing resource was successfully reclaimed or was not successfully reclaimed.

In various implementations, the subscription management service 808 of the subscription management server(s) 602 may transmit a cancel request to interrupt the reclamation actions. For example, the subscription management service 808 of the subscription management server(s) 602 may transmit the cancel to the instance of the resource reclamation service 916 deployed at the home region cloud computing server(s) 604-1, and the instance of the resource reclamation service 916 transmits an indication of the cancel request to respective instances of the resource reclamation service 916 in the regions of the tenancy. In response to receiving the indication of the cancel request, the respective instances of the resource reclamation service 916 may interrupt ongoing reclamation actions in each respective region.

Figure 14:
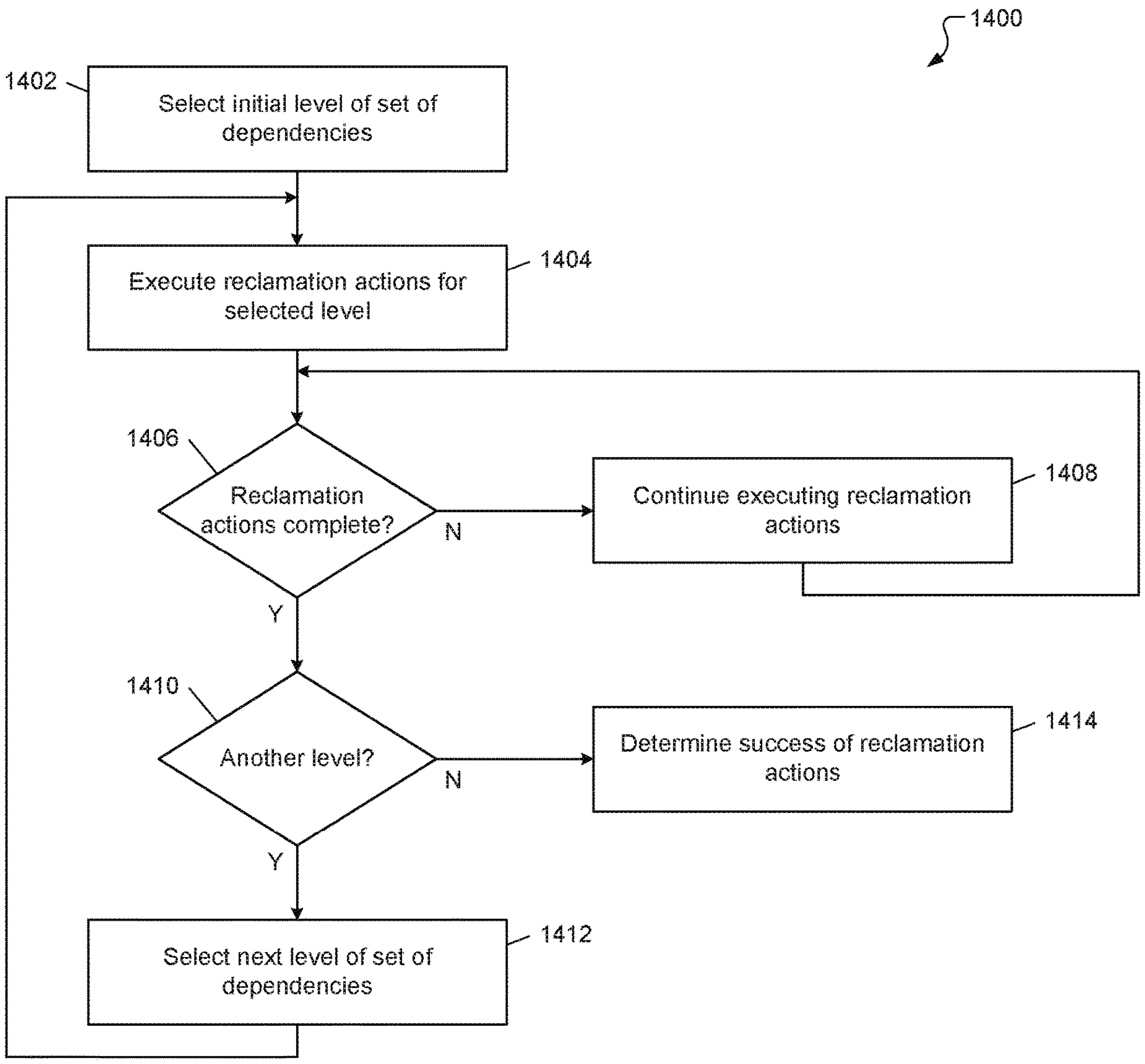
FIG. 14 is a flowchart illustrating an example process for reclaiming a set of computing resources.

FIG. 14 is a flowchart illustrating an example process 1400 for reclaiming a set of computing resources. In the example process 1400, an instance of the resource reclamation service 916 selects an initial level of a set of dependencies (at block 1402). In various implementations, the instance of the resource reclamation service 916 loads the set of dependencies from the registration database 920 and selects the initial level of the loaded set. In some examples, the set of dependencies includes a dependency graph. In various implementations, the resource reclamation service 916 loads the dependency graph specific to a service and/or a configuration of the service. In some examples, the initial level is the leaf level of the set of resources. The leaf level of the set of resources may be the level including computing resources that do not have any dependent computing resources.

In the example process 1400, the instance of the resource reclamation service 916 executes reclamation actions for the computing resources of the selected level (at block 1404). For example, the instance of the resource reclamation service 916 reclaims each computing resource of the selected level. In the example process 1400, the instance of the resource reclamation service 916 determines whether the reclamation actions are complete for the selected level (at decision block 1406). In various implementations, the reclamation actions are complete for the selected level after each computing resource of the selected level is reclaimed. In response to determining that the reclamation actions for the selected level are not complete ("NO" at decision block 1406), the instance of the resource reclamation service 916 continues executing the reclamation actions (at block 1408) and the process 1400 proceeds back to decision block 1406. In response to determining that the reclamation actions for the selected level are complete ("YES" at decision block 1406), the instance of the resource reclamation service 916 determines whether the set of dependencies has another unprocessed level (at decision block 1410).

In response to determining that the set of dependencies has another unprocessed level ("YES" at decision block 1410), the instance of the resource reclamation service 916 selects the next level of the set of dependences (at block 1412) and executes reclamation actions for the selected level (at block 1404). In various implementations, the next level of the set of dependencies is the next level closer to the root level. In response to determining that the set of dependencies does not have another unprocessed level (e.g., all levels of the set of dependencies have been processed—"NO" at decision block 1410), the instance of the resource reclamation service 916 determines that the set of reclamation actions are successfully completed (at block 1414). Returning to FIG. 13, in some examples, the instance of the resource reclamation service 916 deployed at the home region cloud computing server(s) 604-1 initiates the reclamation actions at operation 1316 by performing the process 1400 to reclaim one or more of the computing resources of the tenancy at the home region 612. In various implementations, the instance of the resource reclamation service 916 deployed at the home region cloud computing server(s) 604-1 initiates the reclamation actions by performing the process 1400 to reclaim each of the computing resources of the tenancy at the home region 612.

In the message sequence chart 1300, the instance of the resource reclamation service 916 deployed at the home region cloud computing server(s) 604-1 transmits a success or failure report of the reclamation actions to itself (at operation 1318). In various implementations, the instance of the resource reclamation service 916 deployed at the home region cloud computing server(s) 604-1 reports whether the reclamation action taken for each computing resource of the tenancy in the home region 612 succeeded or failed. In some examples, the instance of the resource reclamation service 916 deployed at the home region cloud computing server(s) 604-1 reports whether the reclamation actions for the tenancy in the home region 612 succeeded or failed. In various implementations, the reclamation actions for the tenancy in the home region 612 succeeds when each reclamation action taken for each computing resource succeeds and fails when any reclamation action fails.

In the message sequence chart 1300, the instance of the resource reclamation service 916 deployed at the local region cloud computing server(s) 604-2 initiates reclamation actions in response to receiving the indication of the terminate event (at operation 1320). In various implementations, the instance of the resource reclamation service 916 reclaims a set of computing resources belonging to the tenancy within its region according to a set of dependencies for the computing resources within the region (such as, for example, any of the previously described sets of dependencies). For example, the instance of the resource reclamation service 916 may reclaim a subset of computing resources that do not have any dependent resources first (e.g., the computing resources at the leaf level). The resource reclamation service 916 may reclaim resources level-by-level proceeding from the leaf level to the root level. In various implementations, the resource reclamation service 916 reclaims the computing resources at each level sequentially or in parallel. In some examples, the resource reclamation service 916 does not reclaim resources at a next level until all reclamation actions at a current level are completed.

In various implementations, the instance of the resource reclamation service 916 deployed at the local region cloud computing server(s) 604-2 initiates the reclamation actions by performing the process 1400 to reclaim each of the computing resources of the tenancy at the local region 614. In the message sequence chart 1300, the instance of the resource reclamation service 916 deployed at the local region cloud computing server(s) 604-2 transmits a success or failure report of the reclamation actions to the instance of the resource reclamation service 916 deployed at the home region cloud computing server(s) 604-1 (at operation 1322). In various implementations, the instance of the resource reclamation service 916 deployed at the local region cloud computing server(s) 604-2 reports whether the reclamation action taken for each computing resource of the tenancy in the local region 614 succeeded or failed. In some examples, the instance of the resource reclamation service 916 deployed at the local region cloud computing server(s) 604-2 reports whether the reclamation actions for the tenancy in the local region 614 succeeded or failed. In various implementations, the reclamation actions for the tenancy in the local region 614 succeed when each reclamation action taken for each computing resource succeeds and fail when any reclamation action fails.

In the message sequence chart 1300, the instance of the resource reclamation service 916 deployed at the local region cloud computing server(s) 604-3 initiates reclamation actions in response to receiving the indication of the terminate event (at operation 1324). In various implementations, the instance of the resource reclamation service 916 reclaims a set of computing resources belonging to the tenancy within its region according to a set of dependencies for the computing resources within the region (such as, for example, any of the previously described sets of dependencies). For example, the instance of the resource reclamation service 916 may reclaim a subset of computing resources that do not have any dependent resources first (e.g., the computing resources at the leaf level). The resource reclamation service 916 may reclaim resources level-by-level proceeding from the leaf level to the root level. In various implementations, the resource reclamation service 916 reclaims the computing resources at each level sequentially or in parallel. In some examples, the resource reclamation service 916 does not reclaim resources at a next level until all reclamation actions at a current level are completed.

In various implementations, the instance of the resource reclamation service 916 deployed at the local region cloud computing server(s) 604-3 initiates the reclamation actions by performing the process 1400 to reclaim each of the computing resources of the tenancy at the local region 614. In the message sequence chart 1300, the instance of the resource reclamation service 916 deployed at the local region cloud computing server(s) 604-3 transmits a success or failure report of the reclamation actions to the instance of the resource reclamation service 916 deployed at the home region cloud computing server(s) 604-1 (at operation 1324). In various implementations, the instance of the resource reclamation service 916 deployed at the local region cloud computing server(s) 604-3 reports whether the reclamation action taken for each computing resource of the tenancy in the local region 614 succeeded or failed. In some examples, the instance of the resource reclamation service 916 deployed at the local region cloud computing server(s) 604-3 reports whether the reclamation actions for the tenancy in the local region 616 succeeded or failed. In various implementations, the reclamation actions for the tenancy in the local region 616 succeeds when each reclamation action taken for each computing resource succeeds and fails when any reclamation action fails.

In the message sequence chart 1300, the instance of the resource reclamation service 916 deployed at the home region cloud computing server(s) 604-1 transmits a success or failure of the reclamation actions across the tenancy to the subscription management service 808 of the subscription management server(s) 602 (at operation 1328). In various implementations, the instance of the resource reclamation service 916 deployed at the home region cloud computing server(s) 604-1 transmits an overall success or failure report of the reclamation actions across the tenancy. For example, the instance of the resource reclamation service 916 deployed at the home region cloud computing server(s) 604-1 transmits an overall success report of the reclamation actions across the tenancy when the reclamation actions for the tenancy in each of the regions 612-616 that the tenancy spans is successful and reports an overall failure of the reclamation actions when any of the regions 612-616 fails. In some examples, the instance of the resource reclamation service 916 deployed at the home region cloud computing server(s) 604-1 transmits a success or failure report of the reclamation actions for each of the regions 612-616 that the tenancy spans. In various implementations, the instance of the resource reclamation service 916 deployed at the home region cloud computing server(s) 604-1 transmits a success or failure report of the reclamation actions for each computing resource of tenancy.

Figure 15:
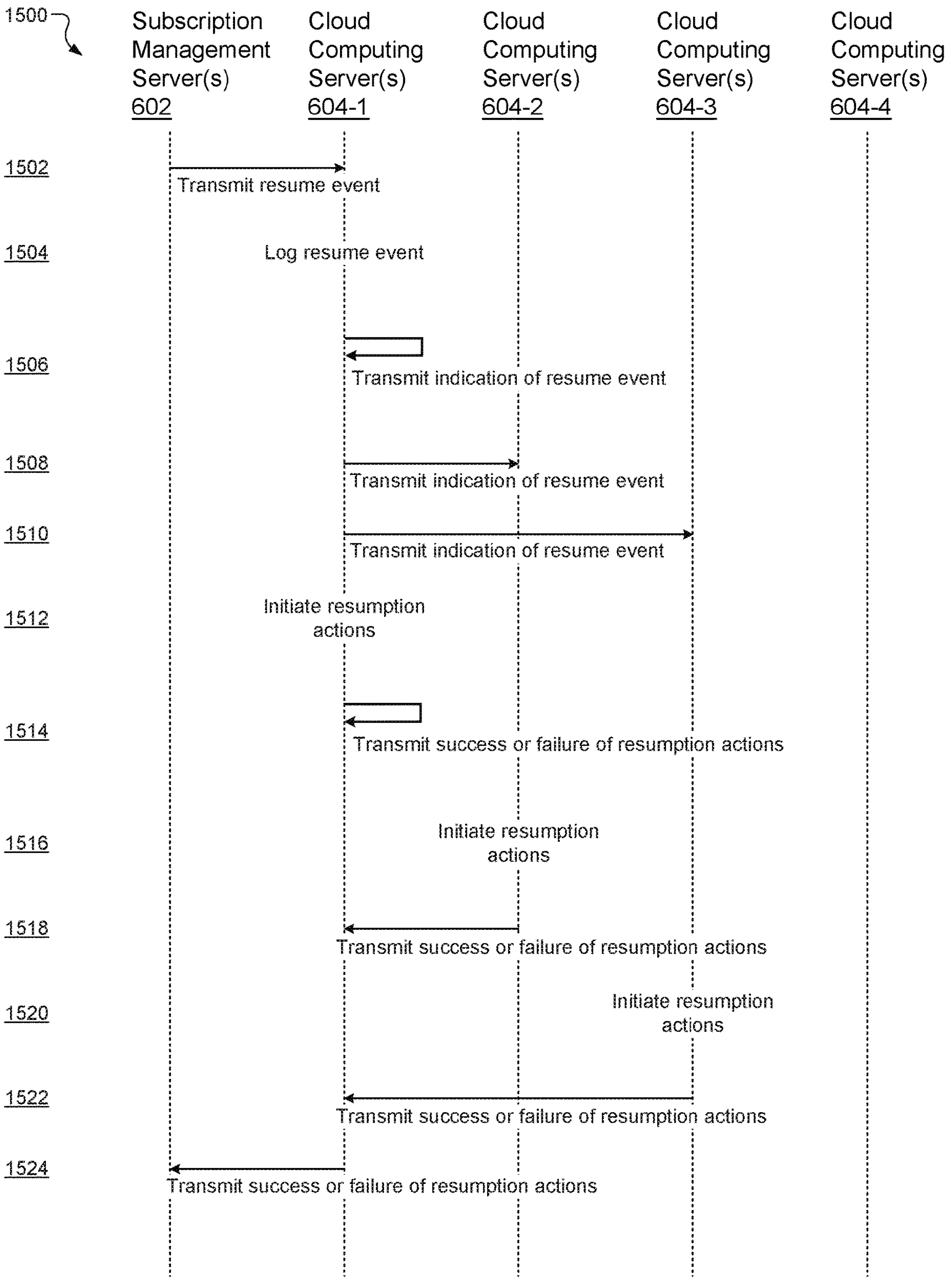
FIG. 15 illustrates a message sequence chart showing example interactions between components of a cloud-based computing system associated with a resume lifecycle event.

FIG. 15 illustrates a message sequence chart 1500 showing example interactions between components of the cloud-based computing system 600 associated with a resume lifecycle event. In the example of FIG. 15, the tenancy spans the regions 612-616 of the realm 608, and the region 612 serves as the home region (while the regions 614 and 616 are local regions). However, in other examples, the tenancy may span any number of regions, including only one region. In the message sequence chart 1500, the subscription management service 808 of the subscription management server(s) 602 transmits a resume event to the instance of the resource reclamation service 916 deployed at the home region cloud computing server(s) 604-1 (at operation 1502). In various implementations, the subscription management service 808 accesses the tenancy metadata 810 to determine which regions the tenancy spans and transmits the resume event to the cloud computing server(s) 604 in the tenancy's home region. In various implementations, the subscription management service 808 transmits the resume event to reverse suspension actions.

In the message sequence chart 1500, the instance of the resource reclamation service 916 deployed at the home region cloud computing server(s) 604-1 receives the resume event and adds the resume event to the event log 918 at the home region cloud computing server(s) 604-1 (at operation 1504). In various implementations, the instance of the resource reclamation service 916 deployed at the home region cloud computing server(s) 604-1 transmits the indication of the resume event to an instance of the resource reclamation service in each region that the tenancy spans. In some examples, the instance of the resource reclamation service 916 deployed at the home region cloud computing server(s) 604-1 accesses the registration database 920 and/or the tenancy metadata 810 to determine which regions the tenancy spans and transmits the indication of the resume event to respective instances of the resource reclamation service 916 in those regions.

For example, in the message sequence chart 1500, the instance of the resource reclamation service 916 deployed at the home region computing server(s) 604-1 transmits the indication of the resume event to itself (at operation 1506). In the message sequence chart 1500, the instance of the resource reclamation service 916 deployed at the home region computing server(s) 604-1 transmits the indication of the resume event to the instance of the resource reclamation service 916 deployed at the local region cloud computing server(s) 604-2 (at operation 1508). In the message sequence chart 1500, the instance of the resource reclamation service 916 deployed at the home region computing server(s) 604-1 transmits the indication of the resume event to the instance of the resource reclamation service 916 deployed at the local region cloud computing server(s) 604-3 (at operation 1510). However, because the tenancy does not span the region 618, the instance of the resource reclamation service 916 deployed at the home region computing server(s) 604-1 does not transmit the indication of the resume event to the instance of the resource reclamation service deployed at the cloud computing server(s) 604-4.

In the message sequence chart 1500, the instance of the resource reclamation service 916 deployed at the home region computing server(s) 604-1 initiates resumption actions in response to receiving the indication of the resume event (at operation 1512). In some examples, the resource reclamation service 916 reverses the suspension actions for any suspended computing resources of the tenancy within its region. For example, the resource reclamation service 916 allocates hardware resources to the suspended computing resources and restores the states of the computing resources. In various implementations, the resource reclamation service 916 reprovisions any reclaimed computing resources of the tenancy within its region back to the tenancy. Thus, resumption actions may be referred to as reverse-reclamation or reverse-suspension actions.

In some examples, the instance of the resource reclamation service 916 deployed at the home region computing server(s) 604-1 may resume a set of computing resources belonging to a tenancy within its region according to a set of dependencies for the computing resources within the region (such as, for example, any of the previously described sets of dependencies). For example, the instance of the resource reclamation service 916 deployed at the home region computing server(s) 604-1 may resume a subset of the set of computing resources that do not depend on other computing resources first (e.g., the computing resources of the root level or a level having suspended resources that is closest to the root level). The resource reclamation service 916 may resume resources level-by-level proceeding from the root level (or the level having suspended computing resources that is closest to the root level) to the leaf level. In various implementations, the resource reclamation service 916 resumes computing resources at each level sequentially or in parallel. In some examples, the resource reclamation service 916 does not resume resources at a next level until all suspension actions at a current level are completed.

In various implementations, the subscription management service 808 of the subscription management server(s) 602 may transmit a cancel request to interrupt the resumption actions. For example, the subscription management service 808 of the subscription management server(s) 602 may transmit the cancel to the instance of the resource reclamation service 916 deployed at the home region cloud computing server(s) 604-1, and the instance of the resource reclamation service 916 transmits an indication of the cancel request to respective instances of the resource reclamation service 916 in the regions of the tenancy. In response to receiving the indication of the cancel request, the respective instances of the resource reclamation service 916 may interrupt ongoing resumption actions in each respective region.

Figure 16:
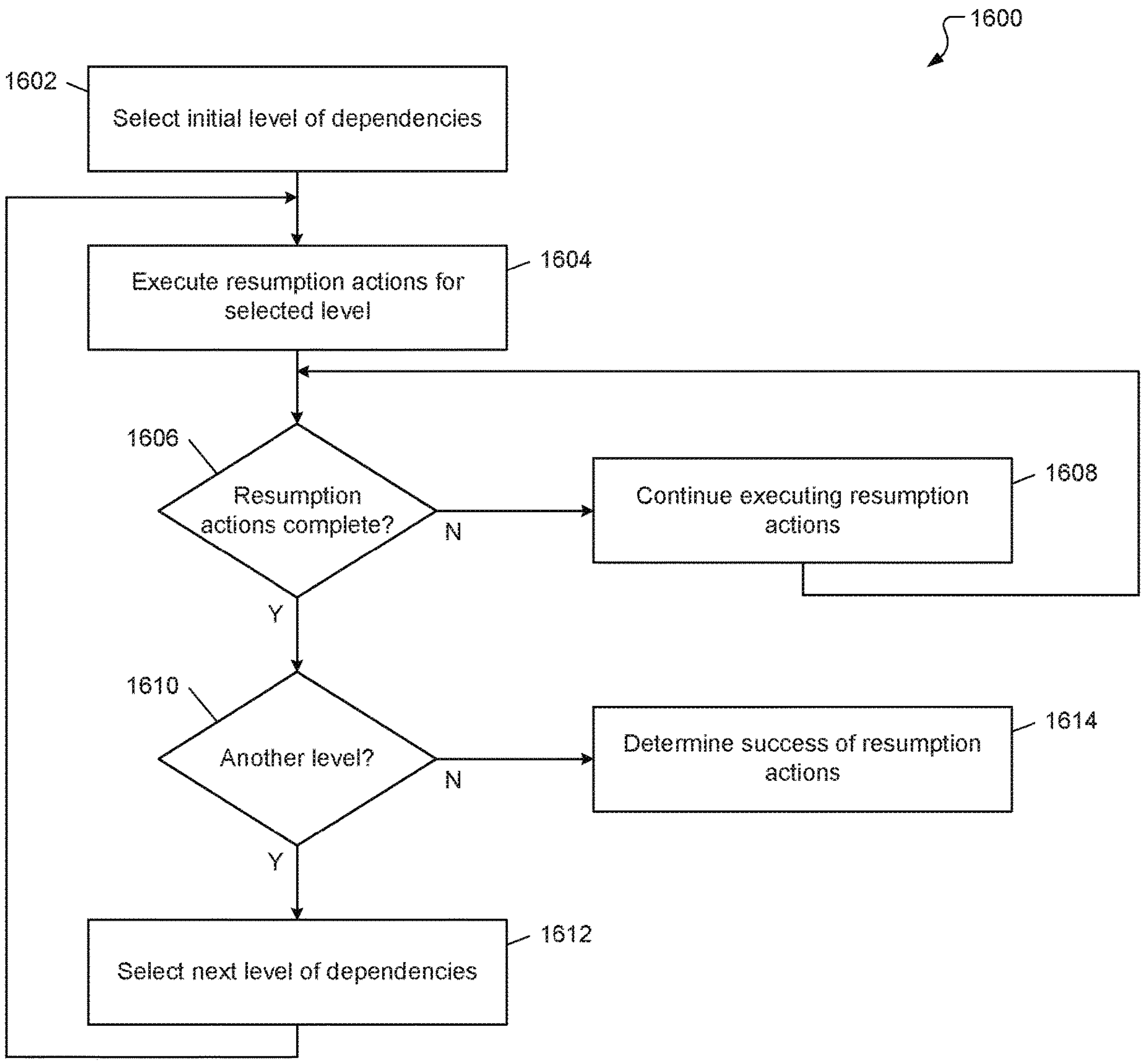
FIG. 16 is a flowchart illustrating an example process for resuming a set of computing resources.

FIG. 16 is a flowchart illustrating an example process 1600 for resuming a set of computing resources. In the example process 1600, an instance of the resource reclamation service 916 selects an initial level of a set of dependencies (at block 1602). In various implementations, the instance of the resource reclamation service 916 loads the set of dependencies from the registration database 920 and selects the initial level of the loaded set. In some examples, the set of dependencies includes a dependency graph. In various implementations, the resource reclamation service 916 loads the dependency graph specific to a service and/or a configuration of the service. In various implementations, the initial level is the level of the set of resources that has suspended resources and is closest to the root level. As previously described, the root level of the set of resources may be the level including computing resources that do not depend on any other computing resources. In the example process 1600, the instance of the resource reclamation service 916 executes resumption actions for the computing resources of the selected level (at block 1604). For example, the instance of the resource reclamation service 916 resumes each computing resource of the selected level.

In the example process 1600, the instance of the resource reclamation service 916 determines whether the resumption actions are complete for the selected level (at decision block 1606). In various implementations, the resumption actions are complete for the selected level after each computing resource of the selected level is reclaimed. In response to determining that the resumption actions for the selected level are not complete ("NO" at decision block 1606), the instance of the resource reclamation service continues executing the resumption actions (at block 1608) and the process 1600 proceeds back to decision block 1606. In response to determining that the resumption actions for the selected level are complete ("YES" at decision block 1606), the instance of the resource reclamation service 916 determines whether the set of dependencies has another unprocessed level (at decision block 1610).

In response to determining that the set of dependencies has another unprocessed level ("YES" at decision block 1610), the instance of the resource reclamation service 916 selects the next level of the set of dependencies (at block 1612) and executes reclamation actions for the selected level (at block 1604). In various implementations, the next level of the set of dependencies is the next level closer to the leaf level. In response to determining that the set of dependencies does not have another unprocessed level (e.g., all levels of the set of dependencies have been processed—"NO" at decision block 1610), the instance of the resource reclamation service 916 determines that the set of reclamation actions are successfully completed (at block 1614). Returning to FIG. 15, in some examples, the instance of the resource reclamation service 916 deployed at the home region cloud computing server(s) 604-1 initiates the reclamation actions at operation 1512 by performing the process 1600 to resume each of the computing resources of the tenancy at the home region 612.

In the message sequence chart 1500, the instance of the resource reclamation service 916 deployed at the home region cloud computing server(s) 604-1 transmits a success or failure report of the resumption actions to itself (at operation 1514). In various implementations, the instance of the resource reclamation service 916 deployed at the home region cloud computing server(s) 604-1 reports whether the resumption action taken for each computing resource of the tenancy in the home region 612 succeeded or failed. In some examples, the instance of the resource reclamation service 916 deployed at the home region cloud computing server(s) 604-1 reports whether the resumption actions for the tenancy in the home region 612 succeeded or failed. In various implementations, the resumption actions for the tenancy in the home region 612 succeeds when each resumption action taken for each computing resource succeeds and fails when any resumption action fails.

In the message sequence chart 1500, the instance of the resource reclamation service 916 deployed at the local region cloud computing server(s) 604-2 initiates resumption actions in response to receiving the indication of the resume event (at operation 1516). For example, the instance of the resource reclamation service 916 deployed at the local region cloud computing server(s) 604-2 may resume a subset of the set of computing resources that do not depend on other computing resources first (e.g., the computing resources of the root level or at a level having suspended computing resources that is closest to the root level). The resource reclamation service 916 may resume resources level-by-level proceeding from the root level (or the level having suspended computing resources that is closest to the root level) to the leaf level. In various implementations, the instance of the resource reclamation service 916 deployed at the local region cloud computing server(s) 604-2 initiates the resumption actions by performing the process 1600 to resume each of the computing resources of the tenancy at the local region 614. In the message sequence chart 1500, the instance of the resource reclamation service 916 deployed at the local region cloud computing server(s) 604-2 transmits a success or failure report of the resumption actions to the instance of the resource reclamation service 916 deployed at the home region cloud computing server(s) 604-1 (at operation 1518). In various implementations, the instance of the resource reclamation service 916 deployed at the local region cloud computing server(s) 604-2 reports whether the resumption action taken for each computing resource of the tenancy in the local region 614 succeeded or failed. In some examples, the instance of the resource reclamation service 916 deployed at the local region cloud computing server(s) 604-2 reports whether the resumption actions for the tenancy in the local region 614 succeeded or failed. In various implementations, the resumption actions for the tenancy in the local region 614 succeeds when each resumption action taken for each computing resource succeeds and fails when any resumption action fails.

In the message sequence chart 1500, the instance of the resource reclamation service 916 deployed at the local region cloud computing server(s) 604-3 initiates resumption actions in response to receiving the indication of the resume event (at operation 1520). For example, the instance of the resource reclamation service 916 deployed at the local region cloud computing server(s) 604-3 may resume a subset of the set of computing resources that do not depend on other computing resources first (e.g., the computing resources of the root level or at a level having suspended computing resources that is closest to the root level). The resource reclamation service 916 may resume resources level-by-level proceeding from the root level (or the level having computing resources that is closest to the root level) to the leaf level. In various implementations, the instance of the resource reclamation service 916 deployed at the local region cloud computing server(s) 604-3 initiates the reclamation actions by performing the process 1600 to resume each of the computing resources of the tenancy at the local region 616. In the message sequence chart 1500, the instance of the resource reclamation service 916 deployed at the local region cloud computing server(s) 604-3 transmits a success or failure report of the resumption actions to the instance of the resource reclamation service 916 deployed at the home region cloud computing server(s) 604-1 (at operation 1522). In various implementations, the instance of the resource reclamation service 916 deployed at the local region cloud computing server(s) 604-3 reports whether the resumption action taken for each computing resource of the tenancy in the local region 614 succeeded or failed. In some examples, the instance of the resource reclamation service 916 deployed at the local region cloud computing server(s) 604-3 reports whether the resumption actions for the tenancy in the local region 616 succeeded or failed. In various implementations, the resumption actions for the tenancy in the local region 616 succeeds when each resumption action taken for each computing resource succeeds and fails when any resumption action fails.

In the message sequence chart 1500, the instance of the resource reclamation service 916 deployed at the home region cloud computing server(s) 604-1 transmits a success or failure report of the resumption actions across the tenancy to the subscription management service 808 of the subscription management server(s) 602 (at operation 1524). In various implementations, the instance of the resource reclamation service 916 deployed at the home region cloud computing server(s) 604-1 transmits an overall success or failure report of the resumption actions across the tenancy. For example, the instance of the resource reclamation service 916 deployed at the home region cloud computing server(s) 604-1 transmits an overall success report of the resumption actions across the tenancy when the resumption actions for the tenancy in each of the regions 612-616 that the tenancy spans is successful and reports an overall failure of the resumption actions when any of the regions 612-616 fails. In some examples, the instance of the resource reclamation service 916 deployed at the home region cloud computing server(s) 604-1 transmits a success or failure report of the resumption actions for each of the regions 612-616 that the tenancy spans. In various implementations, the instance of the resource reclamation service 916 deployed at the home region cloud computing server(s) 604-1 transmits a success or failure report of the resumption actions for each computing resource of tenancy.

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more processes within any given method may be executed in a different order—or processes may be executed concurrently or in combination with each other—without altering the principles of this disclosure. Similarly, instructions stored in a non-transitory computer-readable medium may be executed in a different order—or concurrently—without altering the principles of this disclosure. Unless otherwise indicated, the numbering or other labeling of instructions or method steps is done for convenient reference and does not necessarily indicate a fixed sequencing or ordering.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information—such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element. Furthermore, while the figures illustrate a number of components and/or steps, any one or more of the components and/or steps may be omitted or duplicated, as suitable for the application and setting.

The term computer-readable medium does not encompass transitory electrical or electromagnetic signals or electromagnetic signals propagating through a medium—such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

What is claimed is:

1. A computer-implemented method comprising:

receiving, at a first instance of a resource reclamation service, a first lifecycle event for a tenancy of a cloud computing environment, wherein the first instance is deployed at a first region of a plurality of regions of a cloud environment;

identifying, at the first instance, a subset of the plurality of regions to which computing resources of the tenancy are deployed, the subset of the plurality of regions including the first region and a second region;

initiating and executing, by the first instance deployed at the first region, a multi-region reclamation process corresponding to the first lifecycle event for reclaiming the computing resources of the tenancy from the subset of the plurality of regions, wherein executing the multi-region reclamation process comprises:

executing a first subset of operations associated with reclaiming a first subset of the computing resources of the tenancy deployed at the first region, the first subset of operations comprising:

identifying, at the first instance, the first subset of the computing resources of the tenancy deployed at the first region; and executing, at the first instance, a first set of reclamation actions associated with reclaiming the first subset of the computing resources of the tenancy;

executing a second subset of operations associated with reclaiming a second subset of the computing resources of the tenancy deployed at the second region, the second subset of operations comprising:

transmitting, from the first instance to a second instance of the resource reclamation service, a cross-region notification of the first lifecycle event, wherein the second instance is deployed at the second region;

in response to receiving the cross-region notification of the first lifecycle event at the second instance, identifying, at the second instance, the second subset of the computing resources of the tenancy deployed at the second region; and executing, at the second instance, a second set of reclamation actions associated with reclaiming the second subset of the computing resources of the tenancy;

determining that the first set of reclamation actions and the second set of reclamation actions are successfully executed; and in response to determining that the first set of reclamation actions and the second set of reclamation actions are successfully executed: transmitting a second lifecycle event for initiating a third set of reclamation actions associated with the second lifecycle event.

2. The computer-implemented method of claim 1, further comprising:

based on the cross-region notification of the lifecycle event, identifying, at the second instance, the second subset of the computing resources of the tenancy deployed at the second region.

3. The computer-implemented method of claim 2, further comprising:

transmitting, from the second instance to the first instance, a first report indicating a success or a failure of the second set of reclamation actions.

4. The computer-implemented method of claim 3, further comprising:

transmitting, from the first instance to the second instance, a second report indicating a success or a failure of the first set of reclamation actions.

5. The computer-implemented method of claim 4, further comprising:

transmitting, from the first instance to a subscription management server, a third report indicating a success or a failure of reclamation actions for the computing resources of the tenancy.

6. The computer-implemented method of claim 5, wherein:

The first lifecycle event and the second lifecycle event represent at least a portion of a sequence of lifecycle events; and the subscription management server is configured to transmit the second lifecycle event to the first instance in response to receiving a report indicating a success of reclamation actions associated with the first lifecycle event.

7. The computer-implemented method of claim 6, further comprising:

determining, at the second instance, a first set of dependencies between computing resources of the first subset of the computing resources of the tenancy; and determining, at the second instance, the first set of reclamation actions based on the first set of dependencies.

8. The computer-implemented method of claim 7, further comprising:

determining, at the first instance, a second set of dependencies between computing resources of the second subset of the computing resources of the tenancy; and determining, at the first instance, the second set of reclamation actions based on the second set of dependencies.

9. The computer-implemented method of claim 8, wherein the first set of dependencies comprises a first dependency graph and the second set of dependencies comprises a second dependency graph.

10. The computer-implemented method of claim 1, wherein:

the plurality of regions in the cloud environment includes a third region;

the computing resources of the tenancy are not deployed to the third region; and the first instance is configured to not transmit the cross-region notification of the first lifecycle event to a third instance of the resource reclamation service deployed at the third region.

11. A system comprising:

one or more hardware processors;

one or more non-transitory computer-readable media; and program instructions stored on the one or more non-transitory computer-readable media that, when executed by the one or more hardware processors, cause the system to perform operations comprising:

receiving, at a first instance of a resource reclamation service, a first lifecycle event for a tenancy of a cloud computing environment, wherein the first instance is deployed at a first region of a plurality of regions of a cloud environment;

identifying, at the first instance, a subset of the plurality of regions to which computing resources of the tenancy are deployed, the subset of the plurality of regions including the first region and a second region;

initiating and executing, by the first instance deployed at the first region, a multi-region reclamation process corresponding to the first lifecycle event for reclaiming the computing resources of the tenancy from the subset of the plurality of regions, wherein executing the multi-region reclamation process comprises:

executing a first subset of operations associated with reclaiming a first subset of the computing resources of the tenancy deployed at the first region, the first subset of operations comprising:

identifying, at the first instance, the first subset of the computing resources of the tenancy deployed at the first region; and executing, at the first instance, a first set of reclamation actions associated with reclaiming the first subset of the computing resources of the tenancy;

executing a second subset of operations associated with reclaiming a second subset of the computing resources of the tenancy deployed at the second region, the second subset of operations comprising:

transmitting, from the first instance to a second instance of the resource reclamation service, a cross-region notification of the first lifecycle event wherein the second instance is deployed at the second region;

in response to receiving the cross-region notification of the first lifecycle event at the second instance, identifying, at the second instance, the second subset of the computing resources of the tenancy deployed at the second region; and executing, at the second instance, a second set of reclamation actions associated with reclaiming the second subset of the computing resources of the tenancy;

determining that the first set of reclamation actions and the second set of reclamation actions are successfully executed; and in response to determining that the first set of reclamation actions and the second set of reclamation actions are successfully executed: transmitting a second lifecycle event for initiating a third set of reclamation actions associated with the second lifecycle event.

12. The system of claim 11, wherein the operations further comprise:

based on the cross-region notification of the first lifecycle event, identifying, at the second instance, the second subset of the computing resources of the tenancy deployed at the second region.

13. The system of claim 12, wherein the operations further comprise:

transmitting, from the second instance to the first instance, a first report indicating a success or a failure of the second set of reclamation actions.

14. The system of claim 13, wherein the operations further comprise:

transmitting, from the first instance to the second instance, a second report indicating a success or a failure of the first set of reclamation actions.

15. The system of claim 14, wherein the operations further comprise:

transmitting, from the first instance to a subscription management server, a third report indicating a success or a failure of reclamation actions for the computing resources of the tenancy.

16. The system of claim 15, wherein:

The first lifecycle event is one of a sequence of lifecycle events; and the subscription management server is configured to transmit a next lifecycle event to the first instance in response to receiving a report indicating a success of reclamation actions associated with a previous lifecycle event.

17. The system of claim 16, wherein the operations further comprise:

determining, at the second instance, a first set of dependencies between computing resources of the first subset of the computing resources of the tenancy; and determining, at the second instance, the first set of reclamation actions based on the first set of dependencies.

18. The system of claim 17, wherein the operations further comprise:

determining, at the first instance, a second set of dependencies between computing resources of the second subset of the computing resources of the tenancy; and determining, at the first instance, the second set of reclamation actions based on the second set of dependencies.

19. The system of claim 18, wherein the first set of dependencies comprises a first dependency graph and the second set of dependencies comprises a second dependency graph.

20. One or more non-transitory computer-readable media storing instructions that, when executed by one or more hardware processors, cause performance of operations comprising:

receiving, at a first instance of a resource reclamation service, a first lifecycle event for a tenancy of a cloud computing environment, wherein the first instance is deployed at a first region of a plurality of regions of a cloud environment;

identifying, at the first instance, a subset of the plurality of regions to which computing resources of the tenancy are deployed, the subset of the plurality of regions including the first region and a second region;

initiating and executing, by the first instance deployed at the first region, a multi-region reclamation process corresponding to the first lifecycle event for reclaiming the computing resources of the tenancy from the subset of the plurality of regions, wherein executing the multi-region reclamation process comprises:

executing a first subset of operations associated with reclaiming a first subset of the computing resources of the tenancy deployed at the first region, the first subset of operations comprising:

identifying, at the first instance, the first subset of the computing resources of the tenancy deployed at the first region; and executing, at the first instance, a first set of reclamation actions associated with reclaiming the first subset of the computing resources of the tenancy;

executing a second subset of operations associated with reclaiming a second subset of the computing resources of the tenancy deployed at the second region, the second subset of operations comprising:

transmitting, from the first instance to a second instance of the resource reclamation service, a cross-region notification of the first lifecycle event, wherein the second instance is deployed at the second region;

in response to receiving the cross-region notification of the first lifecycle event at the second instance, identifying, at the second instance, the second subset of the computing resources of the tenancy deployed at the second region; and executing, at the second instance, a second set of reclamation actions associated with reclaiming the second subset of the computing resources of the tenancy;

determining that the first set of reclamation actions and the second set of reclamation actions are successfully executed; and in response to determining that the first set of reclamation actions and the second set of reclamation actions are successfully executed: transmitting a second lifecycle event for initiating a third set of reclamation actions associated with the second lifecycle event.

21. The computer-implemented method of claim 1, wherein executing the multi-region reclamation process comprises:

reclaiming a first resource, of the first subset of the computing resources in the first region, wherein the cross-region notification identifies the first resource as having been reclaimed in connection with the lifecycle event;

responsive at least in part to the cross-region notification identifying the first resource as having been reclaimed in connection with the lifecycle event:

reclaiming a second resource, of the second subset of the computing resources in the second region, and transmitting, from the second instance to the first instance of the resource reclamation service, a notification that the second instance has been successfully reclaimed in connection with the lifecycle event;

responsive at least in part to the notification that the second instance has been successfully reclaimed in connection with the lifecycle event:

reclaiming a third resource in the first region in connection with the lifecycle event.

22. The computer-implemented method of claim 1, further comprising:

determining, at the first instance of the resource reclamation service, a first dependency indicating that reclamation of a first resource in the first region is dependent on reclamation of a second resource in the second region;

transmitting the cross-region notification to the second instance of the resource reclamation service responsive at least in part to determining the first dependency, wherein the cross-region notification identifies at least one of the first resource or the second resource;

determining, at the second instance, a second dependency indicating that reclamation of a third resource in the second region is dependent on reclamation of a fourth resource in the first region;

transmitting, from the second instance to the first instance, a second cross-region notification responsive at least in part to determining the second dependency, wherein the second cross-region notification identifies at least one of the third resource or the fourth resource.

23. The computer-implemented method of claim 1, wherein the first subset of operations comprises: reversibly suspending the first subset of the computing resources, wherein reversibly suspending the first subset of the computing resources comprises storing a state of the first subset of the computing resources to a first storage medium, and releasing a first set of hardware components associated with the first subset of the computing resources;

determining that a time elapsed since storing the state of the first subset of the computing resources meets a threshold;

responsive to determining that the time elapsed since storing the state of the first subset of the computing resources meets the threshold: transferring the state of the first subset of the computing resources from the first storage medium to a second storage medium.

24. The computer-implemented method of claim 1, further comprising:

initiating and executing the multi-region reclamation process responsive to determining that a subscription has ended for the tenancy.

25. The computer-implemented method of claim 1, wherein the lifecycle event comprises a non-payment for a subscription associated with the tenancy;

wherein the multi-region reclamation process for reclaiming the computing resources of the tenancy from the subset of the plurality of regions comprises:

reversibly suspending the tenancy while maintaining the computing resources in one or more hot storage media for a threshold time period;

determining that a time elapsed since storing the computing resources in the one or more hot storage media meets the threshold time period;

transferring the computing resources to one or more cold storage media responsive to determining that the time elapsed since storing the computing resources in the one or more hot storage media meets the threshold time period.

* * * * *